(12) United States Patent
Naito et al.

(10) Patent No.: US 11,442,039 B2
(45) Date of Patent: Sep. 13, 2022

(54) SAMPLE SUPPORT BODY, PRODUCTION METHOD FOR SAMPLE SUPPORT BODY, AND SAMPLE IONIZATION METHOD

(71) Applicant: Hamamatsu Photonics K.K., Hamamatsu (JP)

(72) Inventors: Yasuhide Naito, Hamamatsu (JP); Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 288 days.

(21) Appl. No.: 16/967,266

(22) PCT Filed: Jan. 8, 2019

(86) PCT No.: PCT/JP2019/000222
§ 371 (c)(1),
(2) Date: Aug. 4, 2020

(87) PCT Pub. No.: WO2019/155802
PCT Pub. Date: Aug. 15, 2019

(65) Prior Publication Data
US 2020/0386712 A1 Dec. 10, 2020

(30) Foreign Application Priority Data
Feb. 9, 2018 (JP) .............................. JP2018-021895

(51) Int. Cl.
*G01N 27/62* (2021.01)

(52) U.S. Cl.
CPC .................................. *G01N 27/62* (2013.01)

(58) Field of Classification Search
CPC ........... G01N 33/5082; G01N 33/6848; G01N 27/62; G01N 27/628; H01J 49/0409
See application file for complete search history.

(56) References Cited

U.S. PATENT DOCUMENTS

| | | | |
|---|---|---|---|
| 2007/0105087 A1* | 5/2007 | Ban | G01N 33/6848 |
| | | | 977/902 |
| 2008/0090267 A1 | 4/2008 | Komatsu et al. | |
| 2008/0203291 A1* | 8/2008 | Wagner | B01L 3/5085 |
| | | | 250/281 |

FOREIGN PATENT DOCUMENTS

| | | |
|---|---|---|
| EP | 3214436 A1 | 9/2017 |
| JP | 2002-543440 A | 12/2002 |

(Continued)

OTHER PUBLICATIONS

International Preliminary Report on Patentability dated Aug. 20, 2020 for PCT/JP2019/000222.

*Primary Examiner* — David E Smith
*Assistant Examiner* — Hsien C Tsai
(74) *Attorney, Agent, or Firm* — Faegre Drinker Biddle & Reath LLP

(57) ABSTRACT

Provided is a sample support body that includes: a substrate having a first surface and a second surface opposite to each other; and a conductive layer provided on at least the first surface. A plurality of through-holes, which open to the second surface and a third surface of the conductive layer which is located on a side opposite to the substrate, are formed in the substrate and the conductive layer. At least one of the second surface and the third surface is subjected to surface treatment for providing a difference in an affinity with water between a surface close to the second surface and a surface close to the third surface.

28 Claims, 12 Drawing Sheets

(56) References Cited

FOREIGN PATENT DOCUMENTS

| | | |
|---|---|---|
| JP | 2004-184137 A | 7/2004 |
| JP | 2004-347524 A | 12/2004 |
| JP | 2007-143551 A | 6/2007 |
| JP | 2007-524810 A | 8/2007 |
| JP | 5438330 B2 | 3/2014 |
| JP | 2016-145746 A | 8/2016 |
| JP | 6093492 B1 | 3/2017 |
| WO | WO-00/67293 A1 | 11/2000 |
| WO | WO-2005/029003 A2 | 3/2005 |
| WO | WO 2007/022026 A2 | 2/2007 |
| WO | WO 2017/159878 A1 | 9/2017 |

\* cited by examiner

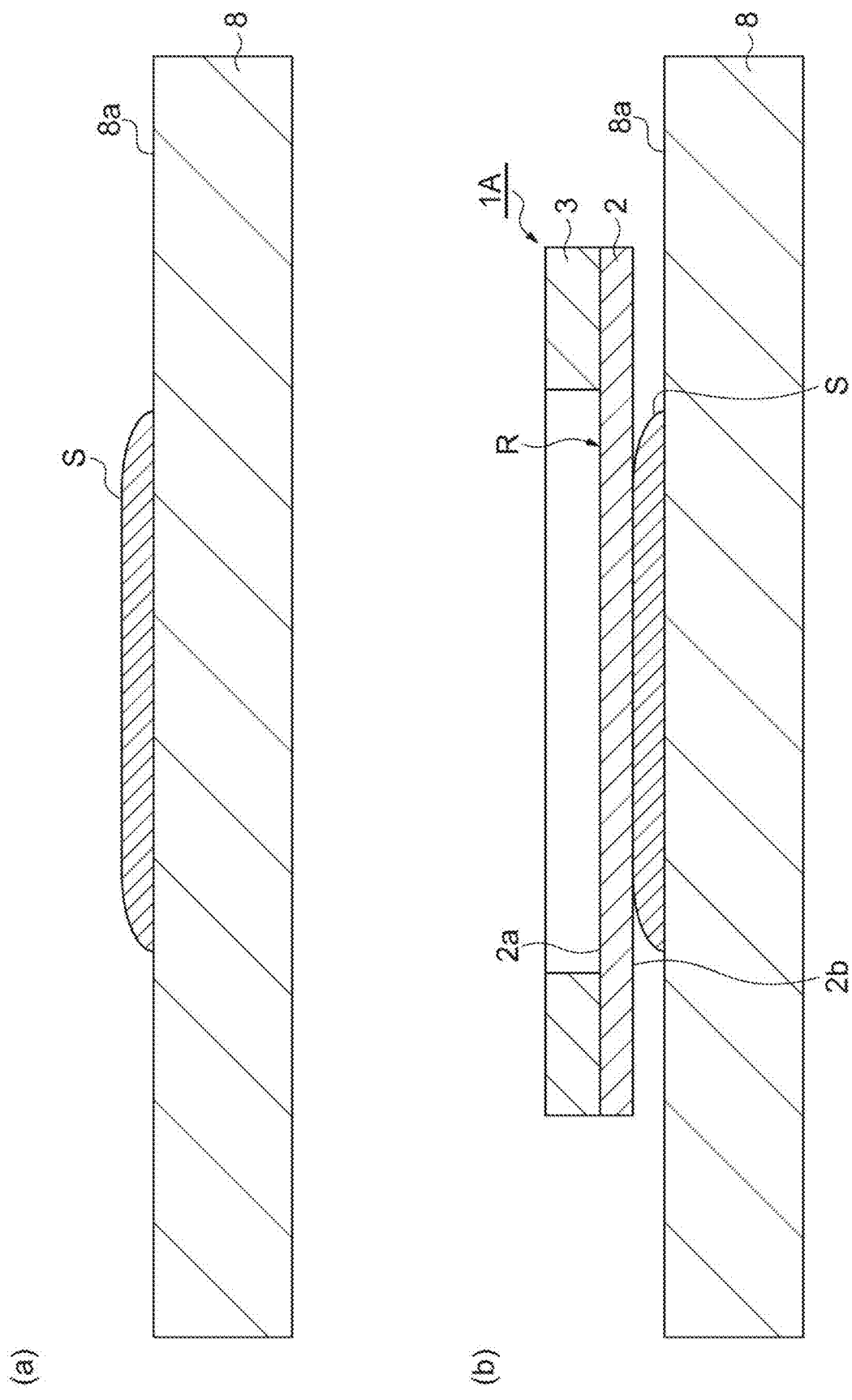

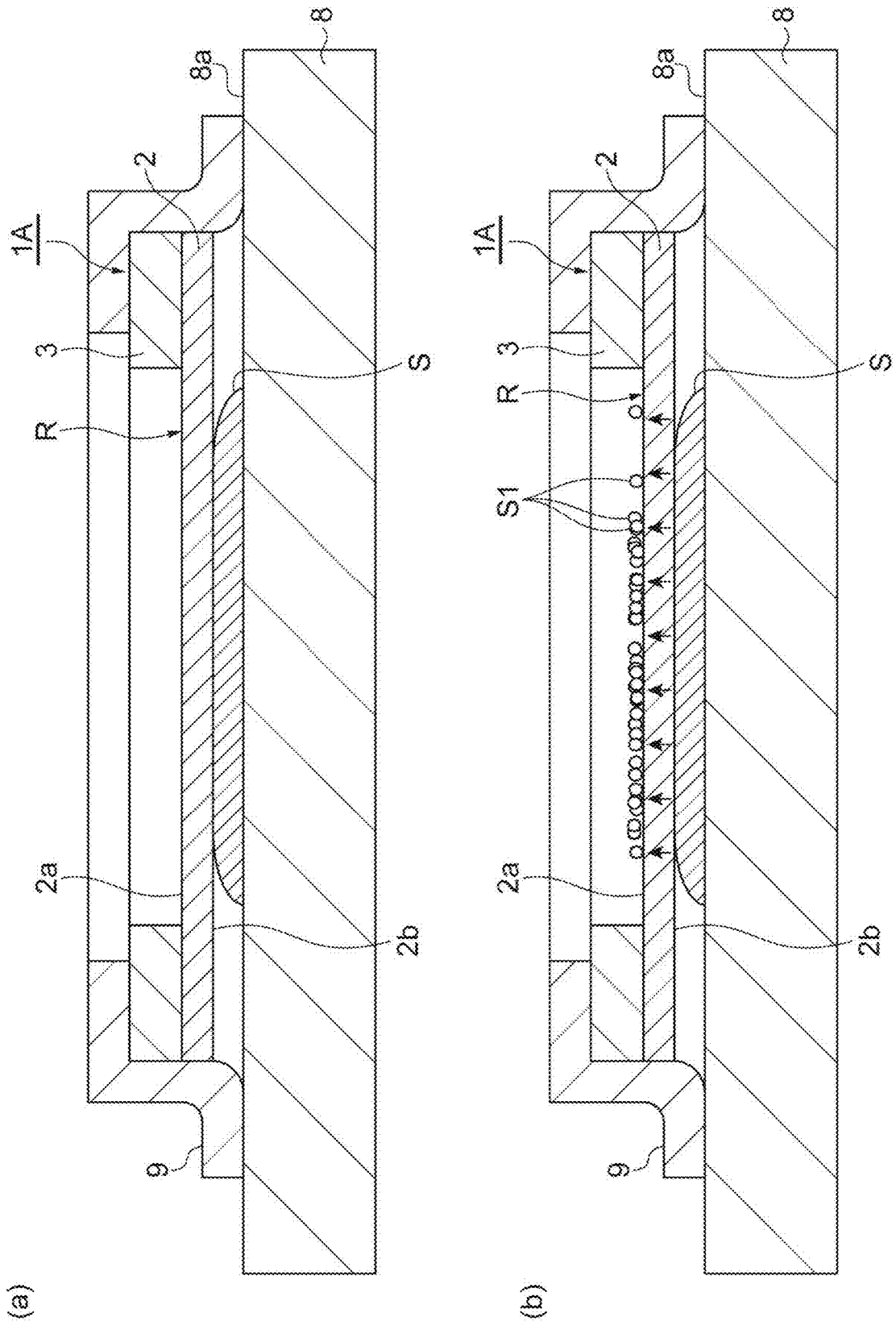

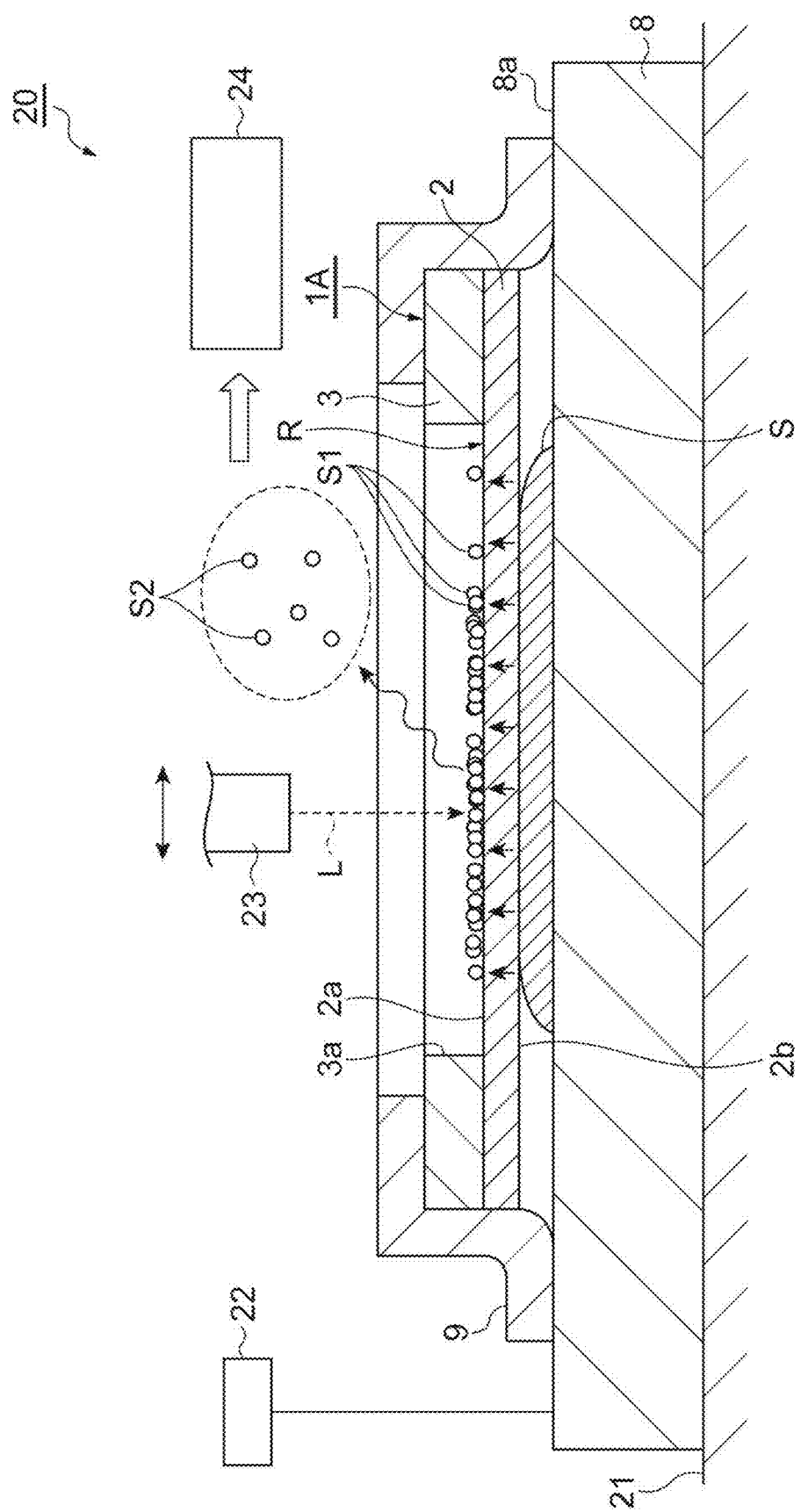

SAMPLE SUPPORT BODY, PRODUCTION METHOD FOR SAMPLE SUPPORT BODY, AND SAMPLE IONIZATION METHOD

TECHNICAL FIELD

The present disclosure relates to a sample support body, a production method for the sample support body, and a sample ionization method.

BACKGROUND ART

In conventional mass spectrometry of a sample such as a biological sample, a sample support body for ionizing the sample is known (e.g., see Patent Literature 1). This sample support body includes a substrate formed with a plurality of through-holes which open to a first surface and a second surface opposite to each other.

CITATION LIST

Patent Literature

[Patent Literature 1] Japanese Patent No. 6093492

SUMMARY OF INVENTION

Technical Problem

In the mass spectrometry as described above, the ionized sample (sample ions) is detected, and the mass spectrometry of the sample is performed on the basis of a result of the detection. In this mass spectrometry, an improvement in signal intensity (sensitivity) is desired.

Therefore, the present disclosure is directed to providing a sample support body capable of improving a signal intensity of sample ions, a production method for the sample support body, and a sample ionization method using the sample support body.

Solution to Problem

A sample support body relating to an aspect of the present disclosure is a sample support body for ionization of a sample, and includes: a substrate having a first surface and a second surface opposite to each other; and a conductive layer provided on at least the first surface. A plurality of through-holes, which open to the second surface and a third surface of the conductive layer which is located on a side opposite to the substrate, are formed in the substrate and the conductive layer, and at least one of the second surface and the third surface is subjected to surface treatment for providing a difference in an affinity with water between a surface close to the second surface and a surface close to the third surface.

The sample support body includes the substrate formed with the plurality of through-holes opening to the second surface and the third surface. For example, a laser beam is applied to the first surface of the substrate in a state in which components of the sample to be measured enter into the plurality of through-holes of the substrate due to a capillary phenomenon, and thus energy of the laser beam is transferred to the components of the sample via the conductive layer, and the components of the sample are ionized. Here, from earnest researches of the inventors of the disclosure, it has been obtained a knowledge that a signal intensity of the ionized sample (the sample ions) is increased by leaving the components of the sample in the through-holes as much as possible. Therefore, in the sample support body, at least one of the third surface of the conductive layer and the second surface of the substrate is subjected to surface treatment for providing a difference in an affinity with water between the surface close to the second surface and the surface close to the third surface. That is, a state in which one surface (hereinafter referred to as "first side") of the second surface and the third surface has a higher affinity with water than the other surface (hereinafter referred to as "second side") of the second surface and the third surface is realized. Thus, the components of the sample to be measured can be made to appropriately enter from the first side having a relatively high affinity with water into the through-holes. Furthermore, outflow of the components of the sample entering into the through-holes out of the inside of the through-holes can be curbed on the second side having a relatively low affinity with water. Therefore, according to the sample support body, the components of the sample can be easily left in the through-holes, and the signal intensity of the sample ions can be improved.

A hydrophobic coating layer may be provided on the second surface such that the surface close to the third surface has a higher affinity with water than the surface close to the second surface. In this case, the outflow of the components of the sample out of openings of the through-holes which are close to the second surface can be curbed by the hydrophobic coating layer provided on the second surface. Thus, for example, in the case where a solution including the sample is dropped onto the third surface of the sample support body, the components of the sample can be made to enter from the openings of the through-holes which are close to the third surface into the through-holes, and the components of the sample can be appropriately left in the through-holes due to the hydrophobic coating layer provided on the second surface. Therefore, according to the above configuration, in a measuring method (hereinafter referred to as "dropping method") that drops the solution including the sample onto the third surface of the sample support body, the signal intensity of the sample ions can be improved. Especially, when the sample having an extremely low concentration is measured, the components of the sample are appropriately left in the through-holes, and thus the components of the sample can be concentrated. As a result, the sample ions can be easily and appropriately detected.

Surface treatment for improving the affinity with water may be performed on the third surface and an inner surface of a portion including an edge of each through-hole which is close to the third surface such that the surface close to the third surface has a higher affinity with water than the surface close to the second surface, and the surface treatment for improving the affinity with water may include at least one of, providing a hydrophilic coating layer on the third surface and the inner surface of the portion, and performing excimer application or plasma application on the third surface and the inner surface of the portion. In this case, the surface treatment for improving the affinity with water is performed on the third surface and the inner surface of the portion including the edge of each through-hole which is close to the third surface, and thus circulation of the components of the sample from the openings of the through-holes which are close to the third surface into the through-holes can be accelerated. Thus, the components of the sample can be made to appropriately enter into the through-holes in the dropping method, and the signal intensity of the sample ions can be improved.

Surface treatment for improving the affinity with water may be performed on the second surface and an inner surface of a portion including an edge of each through-hole which is close to the second surface such that the surface close to the second surface has a higher affinity with water than the surface close to the third surface, and the surface treatment for improving the affinity with water may include at least one of, providing a hydrophilic coating layer on the second surface and the inner surface of the portion, and performing excimer application or plasma application on the second surface and the inner surface of the portion. In this case, the surface treatment for improving the affinity with water is performed on the second surface and the inner surface of the portion including the edge of each through-hole which is close to the second surface, and thus circulation of the components of the sample from the openings of the through-holes which are close to the second surface into the through-holes can be accelerated. Thus, for example, in a measuring method (hereinafter referred to as "sucking method") that disposes the sample support body on the sample such that the second surface of the sample support body faces the sample, the components of the sample can be made to appropriately enter into the through-holes, and the signal intensity of the sample ions can be improved.

A hydrophobic coating layer may be provided on the third surface such that the surface close to the second surface has a higher affinity with water than the surface close to the third surface. In this case, the components of the sample moving the inside of the through-holes from the side of the second surface toward the third surface due to a capillary phenomenon in the sucking method can be inhibited from moving up the other through-holes along the third surface. Thus, original position information of the sample moving toward the third surface (two-dimensional distribution information of molecules of which the sample is composed) can be easily maintained, and accuracy (a resolution) of imaging mass spectrometry can be improved.

The substrate may be formed by anodizing a valve metal or silicon. In this case, the movement of the components of the sample due to a capillary phenomenon can be appropriately realized by the substrate obtained by anodizing a valve metal or silicon.

Widths of the through-holes may be 1 nm to 700 nm. In this case, the movement of the components of the sample due to the aforementioned capillary phenomenon can be appropriately realized A material of the conductive layer may be platinum or gold. In this case, a fixed voltage can be easily and stably applied to the conductive layer.

A sample support body relating to another aspect of the present disclosure is a sample support body for ionization of a sample, and includes a substrate which has conductivity and is formed with a plurality of through-holes which open to a first surface and a second surface opposite to each other. At least one of the first surface and the second surface is subjected to surface treatment for providing a difference in an affinity with water between a surface close to the first surface and a surface close to the second surface, and the surface treatment is treatment that includes at least one of, providing a hydrophilic coating layer on the first surface and an inner surface of a portion including an edge of each through-hole which is close to the first surface such that a surface close to the first surface has a higher affinity with water than a surface close to the second surface, and performing excimer application or plasma application on the first surface and the inner surface of the portion including the edge of each through-hole which is close to the first surface, or treatment that includes at least one of, providing a hydrophilic coating layer on the second surface and an inner surface of a portion including an edge of each through-hole which is close to the second surface such that the surface close to the second surface has a higher affinity with water than the surface close to the first surface, and performing excimer application or plasma application on the second surface and the inner surface of the portion including the edge of each through-hole which is close to the second surface.

According to the sample support body, the conductive layer can be omitted, and the same effects as the sample support body including the aforementioned conductive layer can be obtained.

The hydrophilic coating layer may be a layer formed by forming a film of titanium oxide or zinc oxide. In this case, the hydrophilic coating layer capable of accelerating the circulation of the components of the sample into the through-holes is appropriately realized.

The hydrophobic coating layer may be a layer formed by vapor deposition of a metal, or a layer formed of a self-assembled monolayer. In this case, the hydrophobic coating layer capable of curbing outflow of the components of the sample out of the inside of the through-holes is appropriately realized.

A production method for a sample support body according to an aspect of the present disclosure is a production method for a sample support body for ionization of a sample, and includes: a first process of preparing a substrate having a first surface and a second surface opposite to each other and a conductive layer provided on at least the first surface, wherein a plurality of through-holes, which open to the second surface and a third surface of the conductive layer which is located on a side opposite to the substrate, are formed in the substrate and the conductive layer; and a second process of performing surface treatment, for providing a difference in an affinity with water between a surface close to the second surface and a surface close to the third surface, on at least one of the second surface and the third surface.

According to the production method, the sample support body producing the aforementioned effects can be obtained.

The second process may include a process of providing a hydrophobic coating layer on the second surface such that the surface close to the third surface has a higher affinity with water than the surface close to the second surface. According to the production method, the sample support body capable of inhibiting the components of the sample entering into the through-holes from flowing out of the openings of the through-holes which are close to the second surface, or the sample support body capable of improving the signal intensity of the sample ions in the dropping method, can be obtained.

The second process may include a process of performing surface treatment for improving the affinity with water on the third surface and an inner surface of a portion including an edge of each through-hole which is close to the third surface such that the surface close to the third surface has a higher affinity with water than the surface close to the second surface, and the surface treatment for improving the affinity with water may include at least one of, providing a hydrophilic coating layer on the third surface and the inner surface of the portion, and performing excimer application or plasma application on the third surface and the inner surface of the portion. According to the production method, the sample support body capable of accelerating the circulation of the components of the sample from the openings of the through-holes which are close to the third surface into the through-holes, or the sample support body capable of improving the signal intensity of the sample ions in the dropping method, can be obtained.

The second process may include a process of performing surface treatment for improving the affinity with water on the second surface and an inner surface of a portion including an edge of each through-hole which is close to the second surface such that the surface close to the second surface has a higher affinity with water than the surface close to the third surface, and the surface treatment for improving the affinity with water may include at least one of, providing a hydrophilic coating layer on the second surface and the inner surface of the portion, and performing excimer application or plasma application on the second surface and the inner surface of the portion. According to the production method, the sample support body capable of accelerating the circulation of the components of the sample from the openings of the through-holes which are close to the second surface into the through-holes, or the sample support body capable of improving the signal intensity of the sample ions in the sucking method, can be obtained.

The second process may include a process of providing a hydrophobic coating layer on the third surface such that the surface close to the second surface has a higher affinity with water than the surface close to the third surface. According to the production method, the sample support body capable of inhibiting the components of the sample, which moves the inside of the through-holes from the side of the second surface toward the third surface due to a capillary phenomenon, from moving up the other through-holes along the third surface, or the sample support body capable of improving the accuracy of the imaging mass spectrometry in the sucking method, can be obtained.

A production method for a sample support body relating to another aspect of the present disclosure is a production method for a sample support body for ionization of a sample, and includes: a first process of preparing a substrate which has conductivity and is formed with a plurality of through-holes which open to a first surface and a second surface opposite to each other; and a second process of performing surface treatment, for providing a difference in an affinity with water between a surface close to the first surface and a surface close to the second surface, on at least one of the first surface of the substrate and the second surface of the substrate. The surface treatment is treatment that includes at least one of, providing a hydrophilic coating layer on the first surface and an inner surface of a portion including an edge of each through-hole which is close to the first surface such that a surface close to the first surface has a higher affinity with water than a surface close to the second surface, and performing excimer application or plasma application on the first surface and the inner surface of the portion including the edge of each through-hole which is close to the first surface, or treatment that includes at least one of, providing a hydrophilic coating layer on the second surface and an inner surface of a portion including an edge of each through-hole which is close to the second surface such that the surface close to the second surface has a higher affinity with water than the surface close to the first surface, and performing excimer application or plasma application on the second surface and the inner surface of the portion including the edge of each through-hole which is close to the second surface.

According to the production method, the conductive layer can be omitted, and the sample support body producing the same effects as the sample support body including the aforementioned conductive layer can be obtained.

In the second process, the hydrophilic coating layer may be formed by forming a film of titanium oxide or zinc oxide. In this case, the hydrophilic coating layer can be easily and appropriately formed.

In the second process, the hydrophobic coating layer may be formed by vapor deposition of a metal, or may be formed of a self-assembled monolayer. In this case, the hydrophobic coating layer can be easily and appropriately formed.

A sample ionization method relating to a first aspect of the present disclosure includes: a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer; a second process of mounting the sample support body on a mounting surface of a mount such that the second surface faces the mounting surface; a third process of dropping a solution including a sample onto the plurality of through-holes from a side of the third surface; and a fourth process of applying an energy beam to the third surface while applying a voltage to the conductive layer and thus ionizing components of the sample. A hydrophobic coating layer is provided on the second surface of the substrate such that a surface close to the third surface has a higher affinity with water than a surface close to the second surface.

In the sample ionization method relating to a first aspect, surface treatment for improving the affinity with water may be performed on the third surface and an inner surface of a portion including an edge of each through-hole which is close to the third surface.

According to the sample ionization method relating to a first aspect, ionization is performed by the dropping method using the sample support body that can inhibit the components of the sample entering into the through-holes from flowing out of the openings of the through-holes which are close to the second surface, and thus the sample ions can be appropriately detected. Furthermore, in a case where the surface treatment for improving the affinity with water is performed on the third surface and the inner surface of the portion including the edge of each through-hole which is close to the third surface, the circulation of the components of the sample from the openings of the through-holes which are close to the third surface into the through-holes can be accelerated, and the signal intensity of the sample ions can be more effectively improved.

A sample ionization method relating to a second aspect of the present disclosure includes: a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer; a second process of mounting the sample support body on a mounting surface of a mount such that the second surface faces the mounting surface; a third process of dropping a solution including a sample onto the plurality of through-holes from a side of the third surface; and a fourth process of applying an energy beam to the third surface while applying a voltage to the conductive layer and thus ionizing components of the sample. Surface treatment for improving an affinity with water is performed on the third surface and an inner surface of a portion including an edge of each through-hole which is close to the third surface such that a surface close to the third surface has a higher affinity with water than a surface close to the second surface.

According to the sample ionization method relating to a second aspect, ionization is performed by the dropping method using the sample support body that can accelerate the components of the sample from the openings of the through-holes which are close to the third surface into the through-holes, and thus the sample ions can be appropriately detected.

A sample ionization method relating to a third aspect of the present disclosure includes: a first process of preparing a sample support body that includes a substrate which has conductivity and is formed with a plurality of through-holes that open to a first surface and a second surface opposite to each other; a second process of mounting the sample support body on a mounting surface of a mount such that the second surface faces the mounting surface; a third process of dropping a solution including a sample onto the plurality of through-holes from a side of the first surface; and a fourth process of applying an energy beam to the third surface while applying a voltage to the conductive layer and thus ionizing components of the sample. A hydrophobic coating layer is provided on the second surface of the substrate such that a surface close to the first surface has a higher affinity with water than a surface close to the second surface.

According to the sample ionization method relating to a third aspect, ionization is performed by the dropping method using the sample support body that can inhibit the components of the sample entering into the through-holes from flowing out of the openings of the through-holes which are close to the second surface, and thus the sample ions can be appropriately detected.

A sample ionization method relating to a fourth aspect of the present disclosure includes: a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer; a second process of disposing the sample support body on a sample such that the second surface faces the sample mounted on a mounting surface of a mount; and a third process of applying an energy beam to the third surface while applying a voltage to the conductive layer in a state in which components of the sample move toward the third surface via the plurality of through-holes due to a capillary phenomenon, and thus ionizing the components of the sample. Surface treatment for improving an affinity with water is performed on the second surface and an inner surface of a portion including an edge of each through-hole which is close to the second surface such that a surface close to the second surface has a higher affinity with water than a surface close to the third surface.

In the sample ionization method relating to a fourth aspect, a hydrophobic coating layer may be provided on the third surface such that a surface close to the second surface has a higher affinity with water than a surface close to the third surface.

According to the sample ionization method relating to a fourth aspect, ionization is performed by the sucking method using the sample support body that can accelerate the circulation of the components of the sample from the openings of the through-holes which are close to the second surface into the through-holes, and thus the sample ions can be appropriately detected. Furthermore, in a case where the hydrophobic coating layer may be provided on the third surface, the components of the sample moving toward the third surface can be inhibited from moving up the other through-holes along the third surface, and thus the accuracy of the imaging mass spectrometry can be improved.

A sample ionization method relating to a fifth aspect of the present disclosure includes: a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer; a second process of disposing the sample support body on a sample such that the second surface comes into contact with the sample mounted on a mounting surface of a mount; and a third process of applying an energy beam to the third surface while applying a voltage to the conductive layer in a state in which components of the sample move toward the third surface via the plurality of through-holes due to a capillary phenomenon, and thus ionizing the components of the sample. A hydrophobic coating layer is provided on the third surface such that a surface close to the second surface has a higher affinity with water than a surface close to the third surface.

According to the sample ionization method relating to a fifth aspect, ionization is performed by the sucking method using the sample support body that can inhibit the components of the sample moving toward the third surface from moving up the other through-holes along the third surface, and thus the accuracy of the imaging mass spectrometry can be improved.

A sample ionization method relating to a sixth aspect of the present disclosure includes: a first process of preparing a sample support body that includes a substrate which has conductivity and is formed with a plurality of through-holes that open to a first surface and a second surface opposite to each other; a second process of disposing the sample support body on a sample such that the second surface faces the sample mounted on a mounting surface of a mount; and a third process of applying an energy beam to the third surface while applying a voltage to the substrate in a state in which components of the sample move toward the first surface via the plurality of through-holes due to a capillary phenomenon, and thus ionizing the components of the sample. Surface treatment for improving an affinity with water is performed on the second surface and an inner surface of a portion including an edge of each through-hole which is close to the second surface such that a surface close to the second surface has a higher affinity with water than a surface close to the first surface.

According to the sample ionization method relating to a sixth aspect, ionization is performed by the sucking method using the sample support body that can accelerate the circulation of the components of the sample from the openings of the through-holes which are close to the second surface into the through-holes, and thus the sample ions can be appropriately detected.

In the sample ionization method relating to fourth to sixth aspects, the sample may be a dry sample, and the sample ionization method may further include a process of adding a solution for reducing a viscosity of the sample to the sample mounted on the mounting surface before the third process. In this case, in a case where the sample to be measured is a dry sample, the movement of the components of the sample into the through-holes due to a capillary phenomenon can be accelerated. As a result, in a case where the dry sample is ionized by the sucking method, the signal intensity of the sample ions can be appropriately improved.

Advantageous Effects of Invention

According to the present disclosure, a sample support body capable of improving a signal intensity of sample ions, a production method for the sample support body, and a sample ionization method using the sample support body can be provided.

BRIEF DESCRIPTION OF DRAWINGS

FIG. 10 is a view illustrating a process of a mass spectrometry method using the sample support body illustrated in FIG. 9.
FIG. 11 is a view illustrating a process of the mass spectrometry method using the sample support body illustrated in FIG. 9.
FIG. 12 is a view illustrating a process of the mass spectrometry method using the sample support body illustrated in FIG. 9.

DESCRIPTION OF EMBODIMENTS

Figure 1:
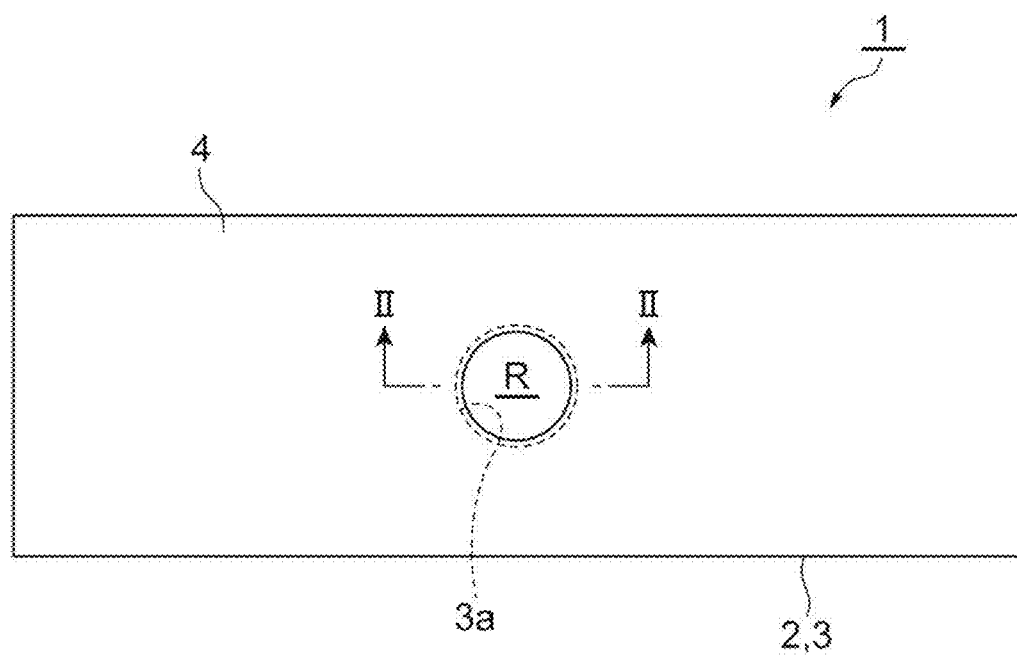
FIG. 1 is a plan view illustrating a sample support body according to a first embodiment.

Hereinafter, embodiments of the present disclosure will be described in detail with reference to the drawings. Note that the same or equivalent portions are denoted by the same reference signs in each of the drawings, and duplicate descriptions thereof will be omitted. Further, dimensions of each member (or each region) illustrated in the drawings or a ratio of the dimensions may be different from actual dimensions or a ratio of the actual dimensions in order to facilitate understanding of the description.

[Configuration of Sample Support Body According to First Embodiment]

Figure 2:
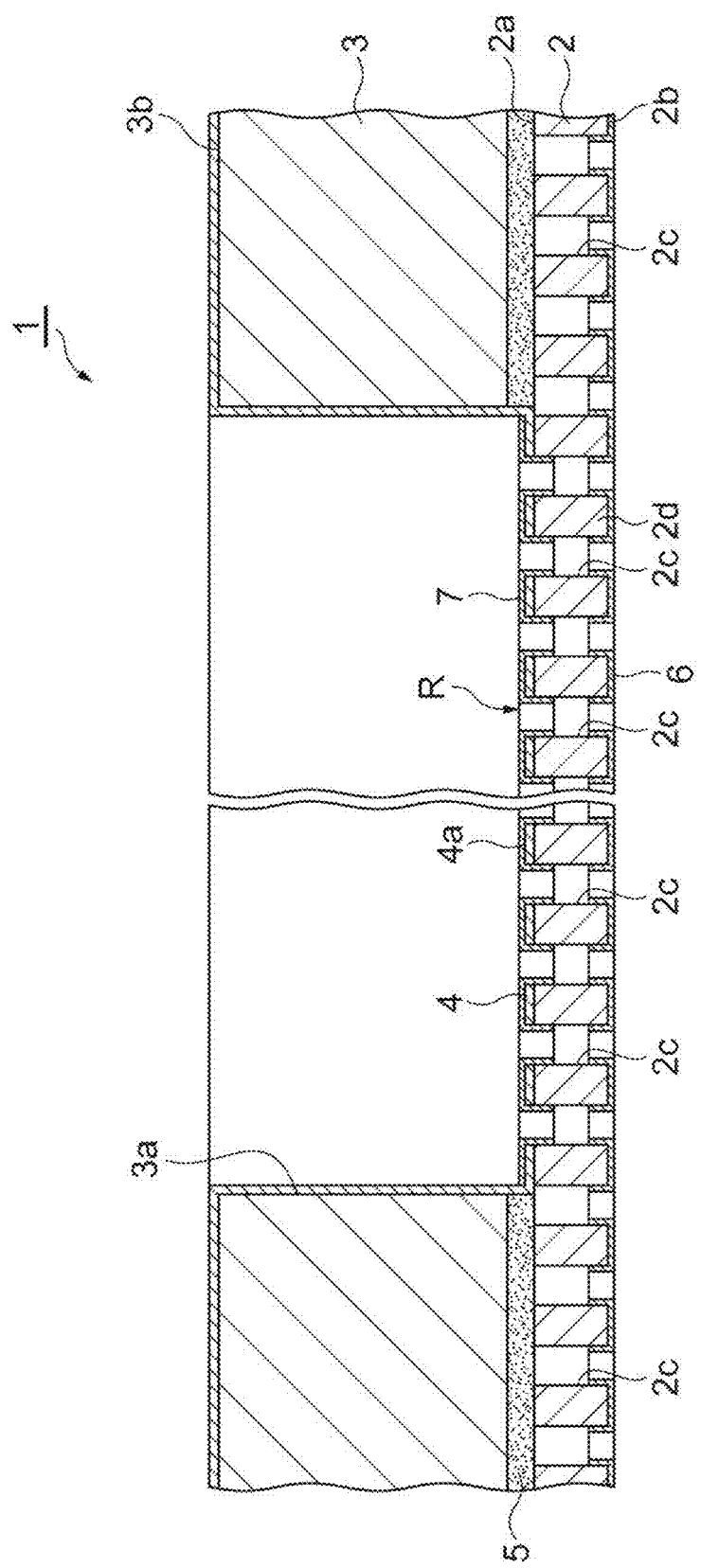
FIG. 2 is a sectional view of the sample support body along line II-II illustrated in FIG. 1.

As illustrated in FIGS. 1 and 2, a sample support body 1 according to a first embodiment includes a substrate 2, a frame 3, and a conductive layer 4. The sample support body 1 is for ionization of a sample. For example, when mass spectrometry is performed, the sample support body 1 is used to ionize components of a sample to be measured. The substrate 2 has a first surface 2a and a second surface 2b opposite to each other. A plurality of through-holes 2c are formed in the substrate 2 in a uniform manner (with uniform distribution). Each of the through-holes 2c extends in a thickness direction of the substrate 2 (a direction perpendicular to the first surface 2a and the second surface 2b), and opens to the first surface 2a and the second surface 2b.

The substrate 2 is formed of, for instance, an insulating material in the shape of a rectangular plate. When viewed in the thickness direction of the substrate 2, a length of one side of the substrate 2 is, for instance, several centimeters or so, and a thickness of the substrate 2 is, for instance, about 1 μm to 50 μm. When viewed in the thickness direction of the substrate 2, shapes of the through-holes 2c are, for instance, nearly circular shapes. Widths of the through-holes 2c are, for instance, about 1 nm to 700 nm. The widths of the through-holes 2c are diameters of the through-holes 2c in a case where, when viewed in the thickness direction of the substrate 2, the shapes of the through-holes 2c are nearly circular shapes, and are diameters (effective diameters) of virtual maximum columns fitted into the through-holes 2c in a case where the shapes are other than nearly circular shapes.

The frame 3 is provided on the first surface 2a of the substrate 2. To be specific, the frame 3 is fixed to the first surface 2a of the substrate 2 by an adhesive layer 5. As a material of the adhesive layer 5, an adhesion material (e.g., a low melting point glass, an adhesive for vacuum, etc.) having little discharge gas is preferably used. When viewed in the thickness direction of the substrate 2, the frame 3 has nearly the same outline as the substrate 2. An opening 3a is formed in the frame 3. A portion of the substrate 2 which corresponds to the opening 3a functions as an effective region R for moving components of a sample toward the first surface 2a by means of a capillary phenomenon (to be described below).

The frame 3 is formed of, for instance, an insulating material in the shape of a rectangular plate. When viewed in the thickness direction of the substrate 2, a length of one side of the frame 3 is, for instance, several centimeters or so, and a thickness of the frame 3 is, for instance, 1 mm or less. When viewed in the thickness direction of the substrate 2, a shape of the opening 3a is, for instance, a circular shape. In that case, a diameter of the opening 3a is, for instance, about several millimeters to tens of millimeters. Due to this frame 3, handling of the sample support body 1 is facilitated, and deformation of the substrate 2 caused by, for instance, a change in temperature is curbed.

The conductive layer 4 is provided on the first surface 2a of the substrate 2. To be specific, the conductive layer 4 is continuously (integrally) formed in a region of the first surface 2a of the substrate 2 which corresponds to the opening 3a of the frame 3 (i.e., a region corresponding to the effective region R), an inner surface of the opening 3a, and a surface 3b of the frame 3 which is located on the side opposite to the substrate 2. The conductive layer 4 covers a portion of the first surface 2a of the substrate 2 at which the through-holes 2c are not formed in the effective region R. That is, openings of the through-holes 2c which are close to the conductive layer 4 are not blocked by the conductive layer 4. That is, the through-holes 2c open to a third surface 4a of the conductive layer 4 which is located on the side opposite to the substrate 2 and the second surface 2b, and the through-holes 2c are exposed to the opening 3a in the effective region R.

The conductive layer 4 is formed of a conductive material. However, as a material of the conductive layer 4, for the reason to be described below, a metal having a low affinity (reactivity) with a sample and high conductivity is preferably used.

For example, if the conductive layer 4 is formed of a metal such as copper (Cu) that has a high affinity with a sample such as a protein, the sample is ionized in a state in which Cu atoms are attached to sample molecules in a process (to be described below) of ionizing the sample, and detection results are likely to deviate according to an attached amount of the Cu atoms in a mass spectrometry method (to be described below). Therefore, as the material of the conductive layer 4, a metal having a low affinity with a sample is preferably used.

Meanwhile, a constant voltage is easily applied to a metal having higher conductivity in an easy and stable way. For this reason, if the conductive layer 4 is formed of a high-conductivity metal, a voltage can be uniformly applied to the first surface 2a of the substrate 2 in the effective region R. Further, a metal having higher conductivity also shows a tendency to have higher thermal conductivity. For this reason, if the conductive layer 4 is formed of a high-conductivity metal, the energy of a laser beam applied to the substrate 2 can be efficiently transmitted to a sample via the conductive layer 4. Therefore, as the material of the conductive layer 4, a high-conductivity metal is preferably used.

In view of the above, for example, gold (Au), platinum (Pt), or the like is used as the material of the conductive layer 4. For example, the conductive layer 4 is formed at a thickness of about 1 nm to 350 nm using a plating method, an atomic layer deposition (ALD) method, a vapor deposition method, a sputtering method, or the like. For example, chromium (Cr), nickel (Ni), titanium (Ti), or the like may be used as the material of the conductive layer 4.

In the sample support body 1, at least one of the second surface 2b of the substrate 2 and the third surface 4a of the conductive layer 4 is subjected to surface treatment for providing a difference in an affinity with water between a surface close to the second surface 2b and a surface close to the third surface 4a. In the present embodiment, as an example, surface treatment for making an affinity with water of the surface close to the second surface 2b lower than that of the substrate material (the substrate 2) is performed on the second surface 2b. Further, surface treatment for making an affinity with water of the surface close to the third surface 4a higher than that of the substrate material is performed on the third surface 4a. Thus, a configuration in which the surface close to the third surface 4a (in the present embodiment, a surface of a coating layer 7 to be described below) has a higher affinity with water than the surface close to the second surface 2b (in the present embodiment, a surface of a coating layer 6 to be described below) is realized.

To be specific, a hydrophobic coating layer 6 is provided on the second surface 2b of the substrate 2. The coating layer 6 is, for instance, a layer (a metal film) formed by vapor deposition of metal. The coating layer 6 is formed of a material having a lower affinity with water than the conductive layer 4. For example, gold (Au) can be used as the material of the coating layer 6. Alternatively, the coating layer 6 may be a layer formed of a self-assembled monolayer (SAM). In the present embodiment, as an example, the coating layer 6 is provided on the second surface 2b, and is also provided on an inner surface of a portion including an edge of each through-hole 2c which is close to the second surface 2b (i.e., at a part, which is close to the second surface 2b, of a lateral surface of a partition portion 2d between the through-holes 2c). However, in order for the coating layer 6 to exhibit a function to be described below, the coating layer 6 may be provided on at least the second surface 2b, and may not be provided on the inner surface of the portion including the edge of each through-hole 2c which is close to the second surface 2b. Further, in the present embodiment, the coating layer 6 is provided on the entire second surface 2b, but may be provided only on a region of the second surface 2b which corresponds to the effective region R (a region overlapping the effective region R when viewed in the thickness direction of the substrate 2). A thickness of the coating layer 6 is, for instance, 1 nm to 100 nm.

Further, a hydrophilic coating layer 7 is provided on the third surface 4a of the conductive layer 4. The coating layer 7 is provided on a region corresponding to the effective region R. The coating layer 7 is also provided on an inner surface of a portion including an edge of each through-hole 2c which is close to the third surface 4a (i.e., at a part, which is close to the first surface 2a, of the lateral surface of the partition portion 2d and a lateral portion of the conductive layer 4). The coating layer 7 is a layer formed, for instance, by forming a film of titanium oxide ($TiO_2$) or zinc oxide (ZnO). The coating layer 7 is formed, for instance, by an atomic layer deposition method. A thickness of the coating layer 7 is, for instance, 1 nm to 50 nm. Further, a width (a length in the thickness direction of the substrate 2) of a portion (i.e., a portion penetrating into the through-hole 2c) of the coating layer 7 which lies along the inner surface of the portion including the edge of each through-hole 2c which is close to the third surface 4a is, for instance, 1 nm to 1000 nm.

Figure 3:
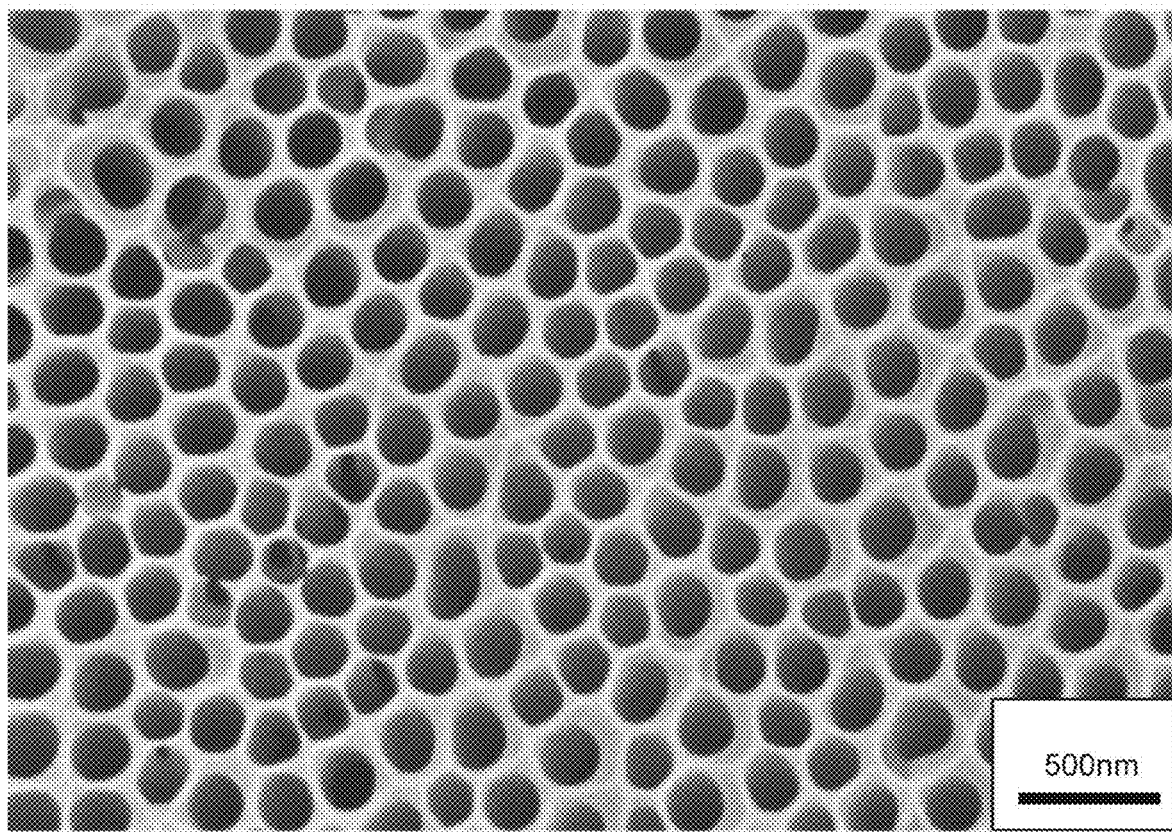
FIG. 3 is a view illustrating an enlarged image of a substrate of the sample support body illustrated in FIG. 1.

FIG. 3 is a view illustrating an enlarged image of the substrate 2 when viewed in the thickness direction of the substrate 2. In FIG. 3, black portions are the through-holes 2c, and white portions are the partition portions 2d. As illustrated in FIG. 3, the plurality of through-holes 2c having approximately constant widths are uniformly formed in the substrate 2. An aperture ratio of the through-holes 2c in the effective region R (a ratio of all the through-holes 2c to the effective region R when viewed in the thickness direction of the substrate 2) ranges from 10% to 80% in view of practical use, and particularly preferably ranges from 60% to 80%. The sizes of the plurality of through-holes 2c may not be uniform with respect to one another, and the plurality of through-holes 2c may be partly coupled to one another.

The substrate 2 illustrated in FIG. 3 is an alumina porous film formed by anodizing aluminum (Al). For example, by performing anodizing treatment on an Al substrate, a surface portion of the Al substrate is oxidized, and a plurality of pores (portions intended to become the through-holes 2c) are formed in the surface portion of the Al substrate. Next, the oxidized surface portion (the anodized film) is peeled from the Al substrate, and pore widening treatment that widens widths of the pores is performed on the peeled anodized film, and thus the aforementioned substrate 2 is obtained. The substrate 2 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like, or by anodizing silicon (Si).

Production Method for Sample Support Body According to the First Embodiment

Figure 4:
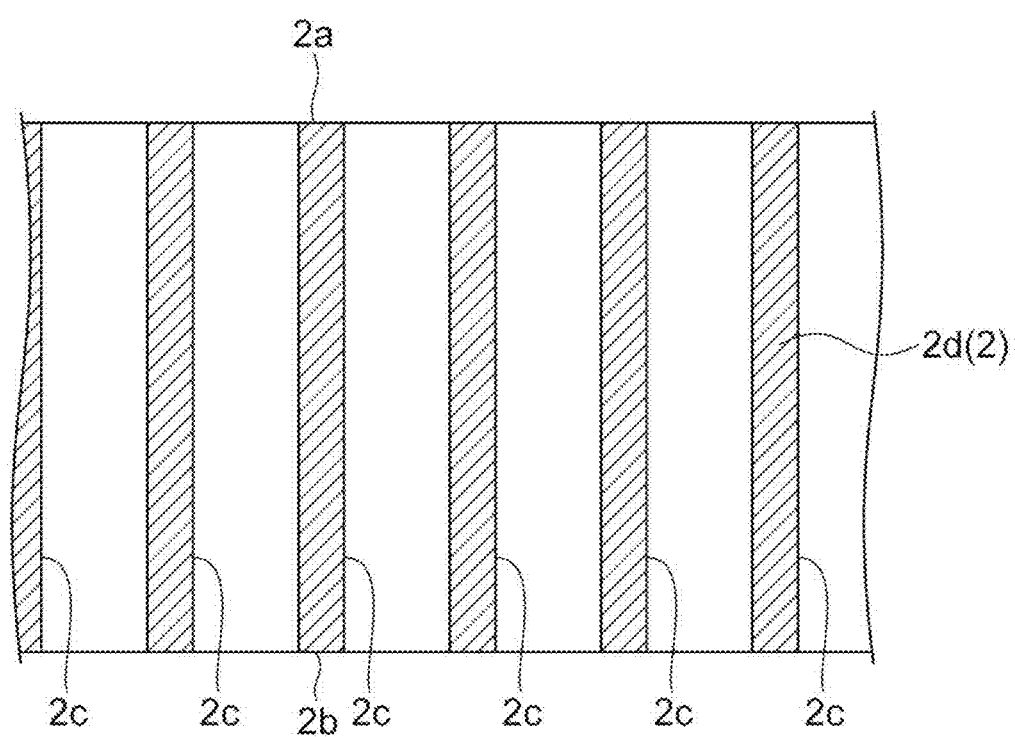
FIG. 4 is a view illustrating a process of a production method for the sample support body illustrated in FIG. 1.
Figure 5:
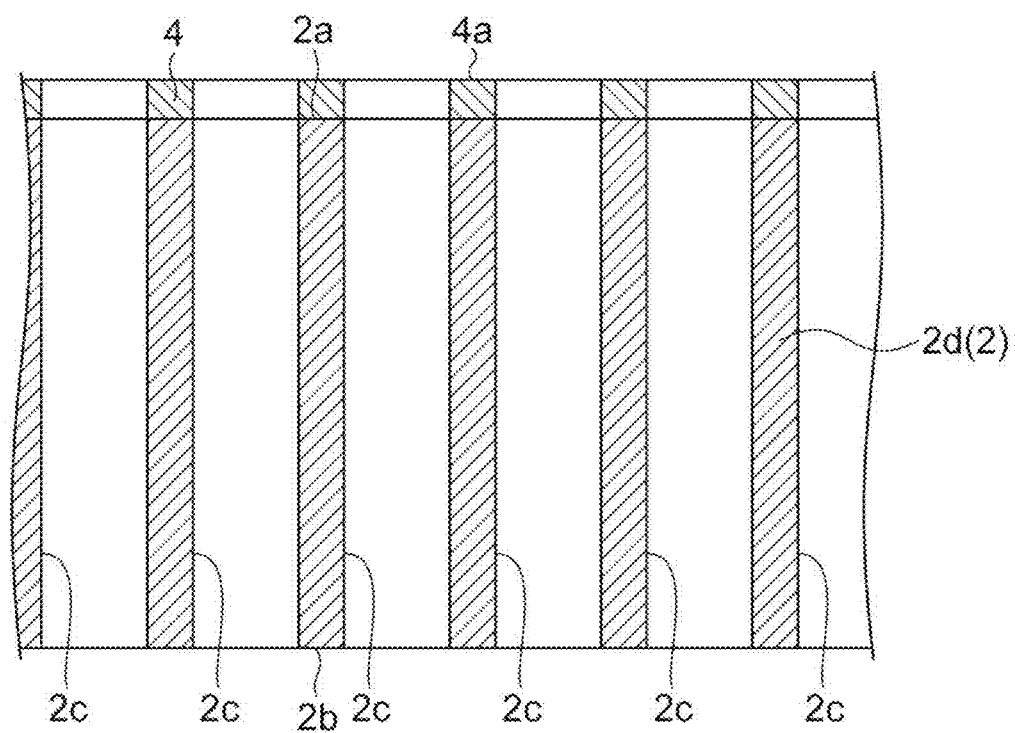
FIG. 5 is a view illustrating a process of the production method for the sample support body illustrated in FIG. 1.
Figure 6:
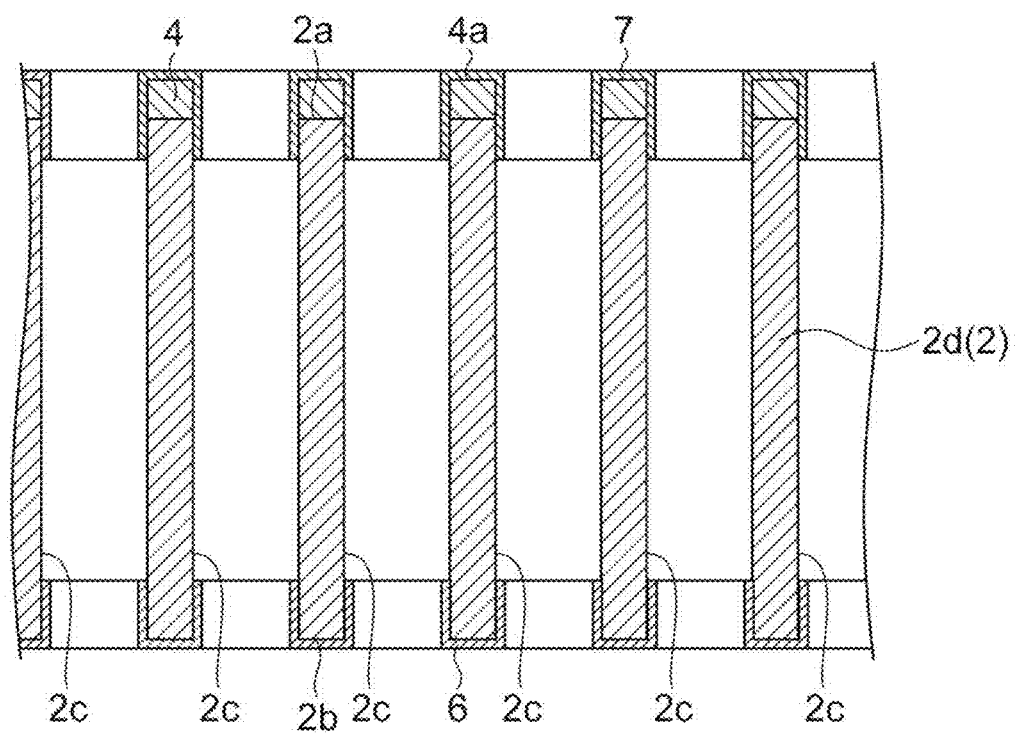
FIG. 6 is a view illustrating a process of the production method for the sample support body illustrated in FIG. 1.

Next, a production method for the sample support body 1 will be described with reference to FIGS. 2 and 4 to 6. Each of FIGS. 4 to 6 is an enlarged sectional view of the portion corresponding to the effective region R. First, as illustrated in FIG. 4, the substrate 2 formed with the plurality of through-holes 2c which open to the first and second surfaces 2a and 2b opposite to each other is prepared. The substrate 2 is obtained, for instance, by anodizing a valve metal or silicon as described above.

Next, as illustrated in FIG. 5, the substrate 2 and the conductive layer 4 (i.e. a structure in which the conductive layer 4 is provided on the first surface 2a of the substrate 2) are prepared (a first process). In the present embodiment, after the frame 3 is fixed to the first surface 2a of the substrate 2 via the adhesive layer 5, the conductive layer 4 is continuously formed on a region of the first surface 2a of the substrate 2 which corresponds to an opening 3a of the frame 3 (i.e., a region that corresponds to the effective region R), an inner surface of the opening 3a, and a surface 3b of the frame 3 which is located on a side opposite to the substrate 2.

Next, as illustrated in FIG. 6, at least one of the second surface 2b of the substrate 2 and the third surface 4a of the conductive layer 4 is subjected to surface treatment for providing a difference in an affinity with water between a surface close to the second surface 2b and a surface close to the third surface 4a (a second process). In the present embodiment, the hydrophobic coating layer 6 is provided on the second surface 2b and an inner surface of a portion including an edge of each through-hole 2c which is close to the second surface 2b such that the surface close to the third surface 4a has a higher affinity with water than the surface close to the second surface 2b. Further, the hydrophilic coating layer 7 is provided on the third surface 4a and an inner surface of a portion including an edge of each through-hole 2c which is close to the third surface 4a. From the above, the sample support body 1 illustrated in FIG. 2 is obtained.

Figure 7:
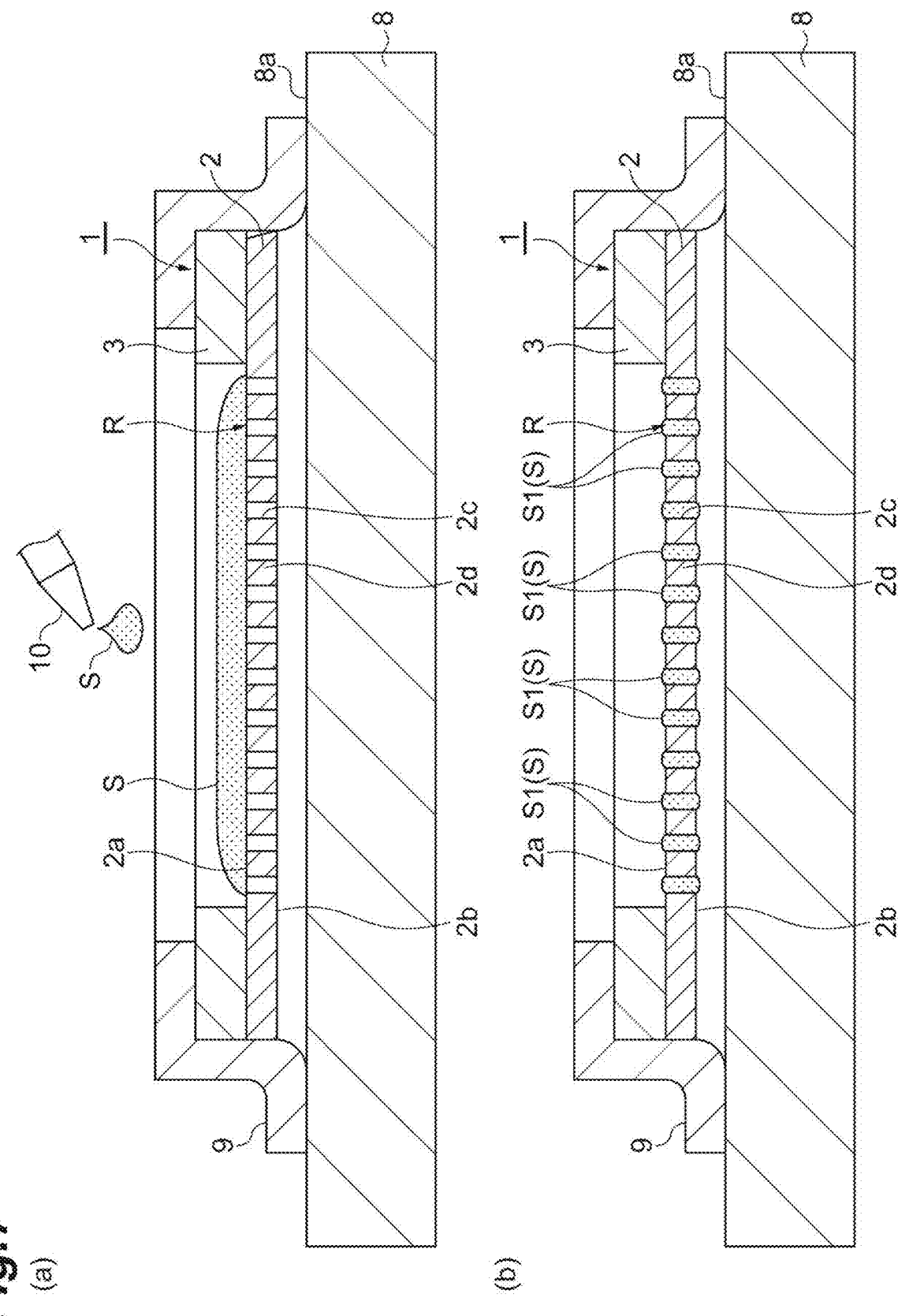
FIG. 7 is a view illustrating a process of a mass spectrometry method using the sample support body illustrated in FIG. 1.
Figure 8:
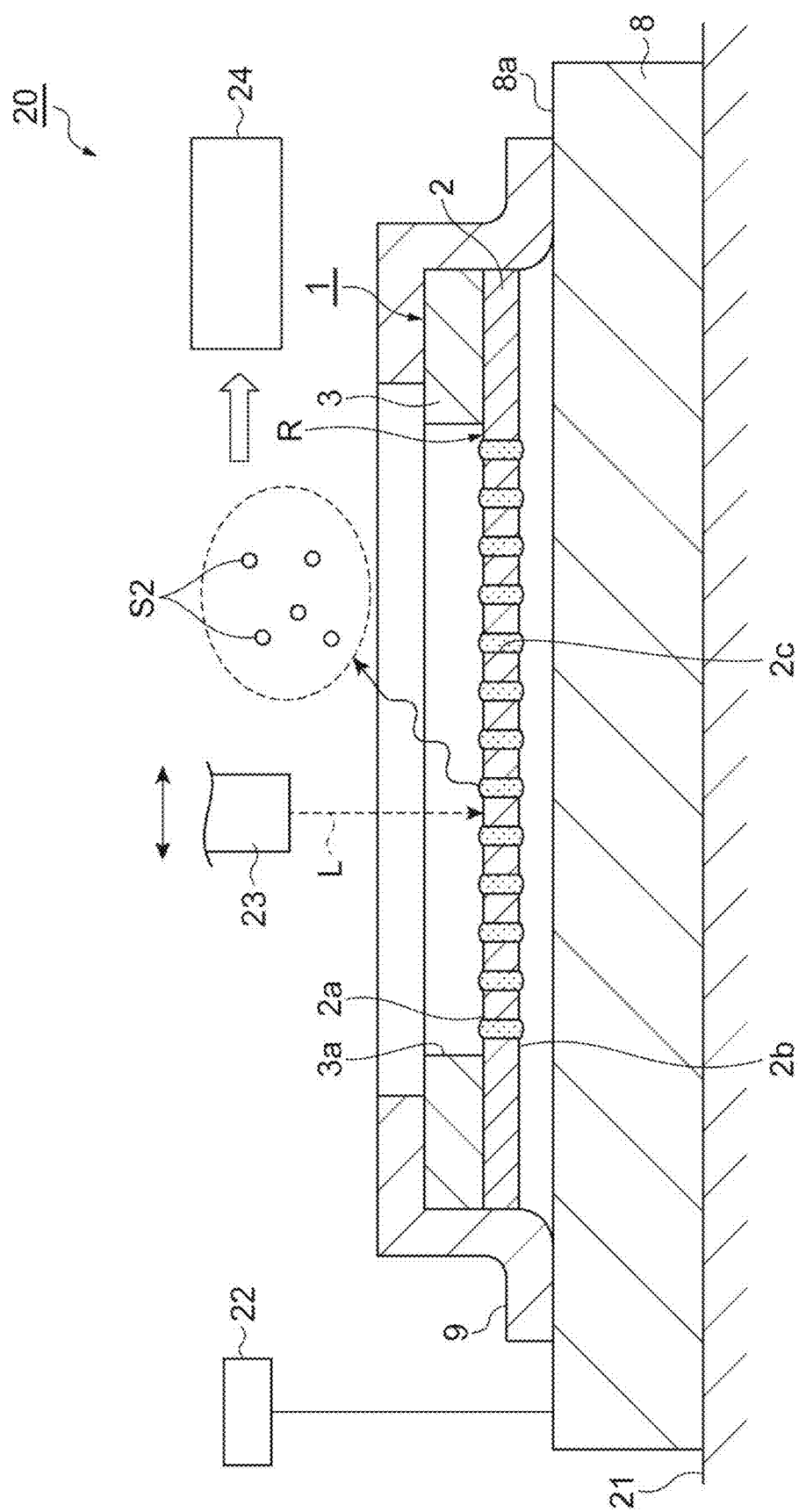
FIG. 8 is a view illustrating a process of the mass spectrometry method using the sample support body illustrated in FIG. 1.

Sample Ionization Method Using Sample Support Body According to the First Embodiment Next, a sample ionization method using the sample support body 1 will be described with reference to FIGS. 7 and 8. Here, as an example, a laser desorption/ionization method (a part of a mass spectrometry method using a mass spectrometer 20) using a laser beam as an energy beam applied for ionization of a sample will be described. In FIGS. 7 and 8, only the through-holes 2c corresponding to the effective region R among the plurality of through-holes 2c formed in the substrate 2 are schematically illustrated. Further, the conductive layer 4, the adhesive layer 5, the coating layer 6, and the coating layer 7 are not illustrated in the sample support body 1. Further, for convenience of illustration, for instance ratios of dimensions are different in the sample support body 1 illustrated in FIGS. 1 and 2 and the sample support body 1 illustrated in FIGS. 7 and 8.

First, the aforementioned sample support body 1 is prepared (a first process). The sample support body 1 may be prepared by being manufactured by a person who carries out the laser desorption/ionization method and the mass spectrometry method, or be prepared by being obtained from a manufacturer or a seller of the sample support body 1.

Next, as illustrated in (a) of FIG. 7, the sample support body 1 is mounted on a mounting surface 8a of a slide glass (a mount) 8 such that the second surface 2b faces the mounting surface 8a (a second process). The slide glass 8 is a glass substrate on which a transparent conductive film such as an indium tin oxide (ITO) film is formed, and a surface of the transparent conductive film becomes the mounting surface 8a. Without being limited to the slide glass 8, a member capable of securing conductivity (e.g., a substrate formed of a metal material such as stainless steel) may be used as the mount. In the present embodiment, as an example, the sample support body 1 is fixed to the slide glass 8 by a conductive tape 9 (e.g., a carbon tape, or the like) such that a gap is provided between the second surface 2b and the mounting surface 8a of the slide glass 8. The gap can function, for instance, as a region for releasing some of a solution, which flows out of the side of the second surface 2b, including a sample S (to be described below). That is, the gap serves to prevent the solution from overflowing on the first surface 2a of the substrate 2 (on the third surface 4a of the conductive layer 4) to impede the ionization of the sample. Further, the tape 9 comes into contact with the conductive layer 4 on the surface 3b of the frame 3, and comes into contact with the mounting surface 8a of the slide glass 8, and thus the sample support body 1 is fixed to the slide glass 8. The tape 9 may be a part of the sample support body 1, or be prepared separately from the sample support body 1. In a case where the tape 9 is a part of the sample support body 1 (i.e. in a case where the sample support body 1 includes the tape 9), the tape 9, for instance, may be fixed close to the first surface 2a at a circumferential edge of the substrate 2 in advance. In the present embodiment, the tape 9 may be fixed on the conductive layer 4 formed on the surface 3b of the frame 3.

Next, as illustrated in (a) of FIG. 7, the solution including the sample S is dropped by a pipette 10 onto the plurality of through-holes 2c (the plurality of through-holes 2c corresponding to the effective region R) from the side of the third surface 4a (a third process). Thus, as illustrated in (b) of FIG. 7, the solution including the sample S enters from the opening of each through-hole 2c which is close to the third surface 4a into each through-hole 2c, and some of the solution including the sample S stays in each through-hole 2c.

Here, in the sample support body 1, the hydrophilic coating layer 7 (see FIGS. 2 and 6) is provided on the third surface 4a and the inner surface of the portion including the edge of each through-hole 2c which is close to the third surface 4a, and thus circulation of components S1 of the sample S from the opening of each through-hole 2c which is close to the third surface 4a into each through-hole 2c is accelerated. That is, the solution including the sample S dropped onto the third surface 4a (onto the coating layer 7) is easy to enter into each through-hole 2c along the hydrophilic coating layer 7. That is, the hydrophilic coating layer 7 serves to appropriately guide the solution close to the third surface 4a into each through-hole 2c. Thus, the components S1 of the sample S can be made to appropriately enter into each through-hole 2c.

Further, in the sample support body 1, the hydrophobic coating layer 6 (see FIGS. 2 and 6) is provided on the second surface 2b, and thus outflow of the components S1 of the sample S, which has entered into each through-hole 2c, out of the opening of each through-hole 2c which is close to the second surface 2b is curbed. That is, the hydrophobic coating layer 6 is provided, and thus the solution including the sample S that attempts to flow out of the opening close to the second surface 2b from the inside of each through-hole 2c is difficult to flow out to the outside along the second surface 2b (along the coating layer 6). That is, the hydrophobic coating layer 6 serves to prevent the solution inside each through-hole 2c from flowing out to the outside along the second surface 2b. Thus, outflow of the components S1 of the sample S, which has entered into each through-hole 2c, out of the side of the second surface 2b can be curbed, and the components S1 can be appropriately left in each through-hole 2c. As a result, the components S1 of the sample S are concentrated in each through-hole 2c.

Next, as illustrated in FIG. 8, in a state in which the sample support body 1 where the components S1 of the sample S stays in each through-hole 2c is fixed to the slide glass 8, the slide glass 8, the sample support body 1, and the sample S are mounted on a support 21 (e.g., a stage) of the mass spectrometer 20. Next, a voltage is applied to the conductive layer 4 (see FIG. 2) of the sample support body 1 via the mounting surface 8a of the slide glass 8 and the tape 9 by a voltage application part 22 of the mass spectrometer 20. In the present embodiment, the conductive layer 4 and the tape 9 are conducted at a portion at which the coating layer 7 is not provided (a portion of the conductive layer 4 provided on the frame 3). However, the conductive layer 4 and the tape 9 may be brought into contact via the coating layer 7, for instance, in a case where the frame 3 is not provided. The coating layer 7 is not a great obstacle to the conduction between the conductive layer 4 and the tape 9 because it is a very thin film.

Next, a laser beam L is applied to the first surface 2a of the substrate 2 (the third surface 4a of the conductive layer 4) via the opening 3a of the frame 3 by a laser beam application part 23 of the mass spectrometer 20. That is, the laser beam L is applied to a region of the first surface 2a of the substrate 2 (i.e., a region corresponding to the effective region R) which corresponds to the opening 3a of the frame 3. In the present embodiment, the laser beam application part 23 scans the laser beam L onto the region corresponding to the effective region R. At least one of the support 21 and the laser beam application part 23 is operated, and thus the scanning of the laser beam L onto the region corresponding to the effective region R can be performed.

In this way, the laser beam L is applied to the first surface 2a of the substrate 2 while a voltage is applied to the conductive layer 4. Thus, the components S1 of the sample S which stay in the through-holes 2c of the substrate 2 (especially, at the side of the first surface 2a) are ionized, and sample ions S2 (the ionized components S1 are discharged (a fourth process). To be specific, energy is transmitted from the conductive layer 4 (see FIG. 2) absorbing energy of the laser beam L to the components S1 of the sample S which stay in the through-holes 2c, and the components S1 of the sample S which obtain the energy are evaporated, and obtain electric charges to become the sample ions S2. The above first to fourth processes are equivalent to the ionization method (here, the laser desorption/ionization method) of the sample S using the sample support body 1. The coating layer 7 is provided on the third surface 4a of the conductive layer 4, but because the coating layer 7 is a very thin film as described above, the coating layer 7 is not a great obstacle in applying the laser beam L to the conductive layer 4.

The discharged sample ions S2 move while being accelerated toward a ground electrode (not illustrated) provided between the sample support body 1 and an ion detector 24 of the mass spectrometer 20. That is, the sample ions S2 move while being accelerated toward the ground electrode by a potential difference generated between the conductive layer 4 to which a voltage is applied and the ground electrode. The sample ions S2 are detected by the ion detector 24 (a fifth process). In the present embodiment, the mass spectrometer 20 is a scanning mass spectrometer using time-of-flight mass spectrometry (TOF-MS). The above first to fifth processes are equivalent to the mass spectrometry method using the sample support body 1.

Operation and Effects of the First Embodiment

As described above, the sample support body 1 include the substrate 2 formed with the plurality of through-holes 2c opening to the second surface 2b and the third surface 4a. For example, in a state in which the components S1 of the sample S to be measured enter into the plurality of through-holes 2c of the substrate 2 due to a capillary phenomenon, the laser beam is applied to the first surface 2a of the substrate 2 (the third surface 4a of the conductive layer 4). Thus, the energy of the laser beam is transmitted to the components S1 of the sample S via the conductive layer 4, and the components S1 of the sample S are ionized. Here, from earnest researches of the inventors of the disclosure, it has been obtained a knowledge that a signal intensity of the ionized sample (the sample ions S2) is increased by leaving the components S1 of the sample S in the through-holes 2c as much as possible. Therefore, in the sample support body 1, at least one of the third surface 4a of the conductive layer 4 and the second surface 2b of the substrate 2 is subjected to surface treatment for providing a difference in an affinity with water between the surface close to the second surface 2b and the surface close to the third surface 4a. That is, a state in which one surface of the second surface 2b and the third surface 4a (in the present embodiment, the surface of the coating layer 7 provided on the third surface 4a) has a higher affinity with water than the other surface of the second surface 2b and the third surface 4a (in the present embodiment, the surface of the coating layer 6 provided on the second surface 2b) is realized. Thus, the components S1 of the sample S to be measured can be made to appropriately enter from the surface close to the third surface 4a having a relatively high affinity with water into the through-holes 2c. Furthermore, the outflow of the components S1 of the sample S entering into the through-holes 2c out of the inside of the through-holes 2c can be curbed on the surface close to the second surface 2b having a relatively low affinity with water. Therefore, according to the sample support body 1, the components S1 of the sample S can be easily left in the through-holes 2c, and the signal intensity of the sample ions S2 can be improved.

Further, the hydrophobic coating layer 6 is provided on the second surface 2b such that the surface close to the third surface 4a has a higher affinity with water than the surface close to the second surface 2b. The outflow of the components S1 of the sample S entering into the through-holes 2c out of the openings of the through-holes 2c which are close to the second surface 2b can be curbed by the coating layer 6. Thus, for example, in the case where the solution including the sample S is dropped onto the third surface 4a of the sample support body 1, the components S1 of the sample S can be made to enter from the openings of the through-holes 2c which are close to the third surface 4a into the through-holes 2c, and the components S1 of the sample S can be appropriately left in the through-holes 2c due to the hydrophobic coating layer 6 provided on the second surface 2b. Therefore, according to the above configuration, in a measuring method (hereinafter referred to as "dropping method") that drops the solution including the sample S onto the third surface 4a of the sample support body 1, the signal intensity of the sample ions S2 can be improved. Especially, when the sample S having an extremely low concentration (e.g., a concentration of 1 μmol/L or lower) is measured, the components S1 of the sample S are appropriately left in the through-holes 2c, and thus the components S1 of the sample S can be concentrated. As a result, the sample ions S2 can be easily and appropriately detected (the signal detection in the aforementioned mass spectrometry is possible).

Further, surface treatment for improving an affinity with water is performed on the third surface 4a and the inner surface of the portion including the edge of each through-hole 2c which is close to the third surface 4a. In the present embodiment, the hydrophilic coating layer 7 is provided on the third surface 4a and the inner surface of the portion. Due to the coating layer 7, the circulation of the components S1 of the sample S from the openings of the through-holes 2c which are close to the third surface 4a into the through-holes 2c can be accelerated. Thus, the components S1 of the sample S can be made to appropriately enter into the through-holes 2c in the dropping method, and the signal intensity of the sample ions S2 can be improved.

Further, the substrate 2 is formed by anodizing a valve metal or silicon. In this case, movement of the components S1 of the sample S due to a capillary phenomenon can be appropriately realized by the substrate 2 obtained by anodizing a valve metal or silicon.

Further, widths of the through-holes 2c are 1 nm to 700 nm. In this case, the movement of the components S1 of the sample S due to the aforementioned capillary phenomenon can be appropriately realized.

Further, a material of the conductive layer 4 is platinum or gold. In this case, a fixed voltage can be easily and stably applied to the conductive layer 4.

Further, the hydrophilic coating layer 7 is a layer formed by forming a film of titanium oxide or zinc oxide. In this case, the hydrophilic coating layer 7 that can accelerate the circulation of the components S1 of the sample S into the through-holes 2c is appropriately realized.

Further, the hydrophobic coating layer 6 is a layer formed by vapor deposition of a metal or a layer formed of a self-assembled monolayer. In this case, the hydrophobic coating layer 6 that can curb the outflow of the components S1 of the sample S out of the inside of the through-holes 2c is appropriately realized.

Further, according to the production method for the aforementioned sample support body 1, the sample support body 1 can be appropriately obtained. To be specific, the second process in the production method for the sample support body 1 includes a process of providing the hydrophobic coating layer 6 on the second surface 2b. Thus, the sample support body 1 that can inhibit the components S1 of the sample S entering into the through-holes 2c from flowing out of the openings of the through-holes 2c which are close to the second surface 2b, or the sample support body 1 that can improve the signal intensity of the sample ions S2 in the dropping method, can be obtained. Further, the second process includes a process of performing the surface treatment for improving the affinity with water on the third surface 4a and the inner surface of the portion including the edge of each through-hole 2c which is close to the third surface 4a. In the present embodiment, the second process includes a process of providing the hydrophilic coating layer 7 on the third surface 4a and the inner surface of the portion. Thus, the sample support body 1 capable of accelerating the circulation of the components S1 of the sample S from the openings of the through-holes 2c which are close to the third surface 4a into the through-holes 2c can be obtained. Further, in the second process, the hydrophilic coating layer 7 is formed by forming a film of titanium oxide or zinc oxide. Thus, the hydrophilic coating layer 7 can be easily and appropriately formed. Further, in the second process, the hydrophobic coating layer 6 is formed by vapor deposition of a metal or of a self-assembled monolayer. Thus, the hydrophobic coating layer 6 can be easily and appropriately formed.

Further, according to the sample ionization method using the aforementioned sample support body 1, ionization is performed by the dropping method using the sample support body 1 that can inhibit the components S1 of the sample S entering into the through-holes 2c from flowing out of the openings of the through-holes 2c which are close to the second surface 2b, and thus the sample ions S2 can be appropriately detected. Furthermore, the surface treatment for improving the affinity with water is performed on the third surface 4a and the inner surface of the portion including the edge of each through-hole 2c which is close to the third surface 4a (in the present embodiment, the formation of the coating layer 7), and thus the circulation of the components S1 of the sample S from the openings of the through-holes 2c which are close to the third surface 4a into the through-holes 2c can be accelerated, and the signal intensity of the sample ions S2 can be more effectively improved.

Modification of the First Embodiment

In the first embodiment, the surface treatment is performed on both the second surface 2b and the third surface 4a (here, the formation of the coating layers 6 and 7), but the surface treatment may be performed on only either the second surface 2b or the third surface 4a. For example, in a case where there is no need to further accelerate inflow of the components S1 of the sample S from the openings of the through-holes 2c which are close to the third surface 4a, the aforementioned coating layer 7 may be omitted. Further, for example, in a case where there is no need to further curb outflow of the components S1 of the sample S from the openings of the through-holes 2c which are close to the second surface 2b, the aforementioned coating layer 6 may be omitted.

Further, the substrate 2 may have conductivity, and a voltage may be applied to the substrate 2 in a mass spectrometry method. In the case where the substrate 2 has conductivity, the conductive layer 4 can be omitted in the sample support body 1, and the same effects as in the case where the sample support body 1 including the aforementioned conductive layer 4 is used can be obtained. In this case, "the third surface 4a of the conductive layer 4" in the first embodiment is read as "the first surface 2a." That is, the coating layer 7 that is provided on the third surface 4a and the inner surface of the portion including the edge of each through-hole 2c which is close to the third surface 4a is provided on the first surface 2a and the inner surface of the portion including the edge of each through-hole 2c which is close to the first surface 2a.

Configuration of Sample Support Body According to Second Embodiment

Next, a sample support body 1A according to a second embodiment will be described with reference to FIG. 9. The sample support body 1A is different from the sample support body 1 according to the first embodiment in that the surface close to the second surface 2b has a higher affinity with water than the surface close to the third surface 4a. To be specific, in the sample support body 1A, surface treatment for making the affinity with water of the surface close to the second surface 2b higher than a substrate material is performed on the second surface 2b, and surface treatment for making the affinity with water of the surface close to the third surface 4a lower than the substrate material is performed on the third surface 4a.

Figure 9:
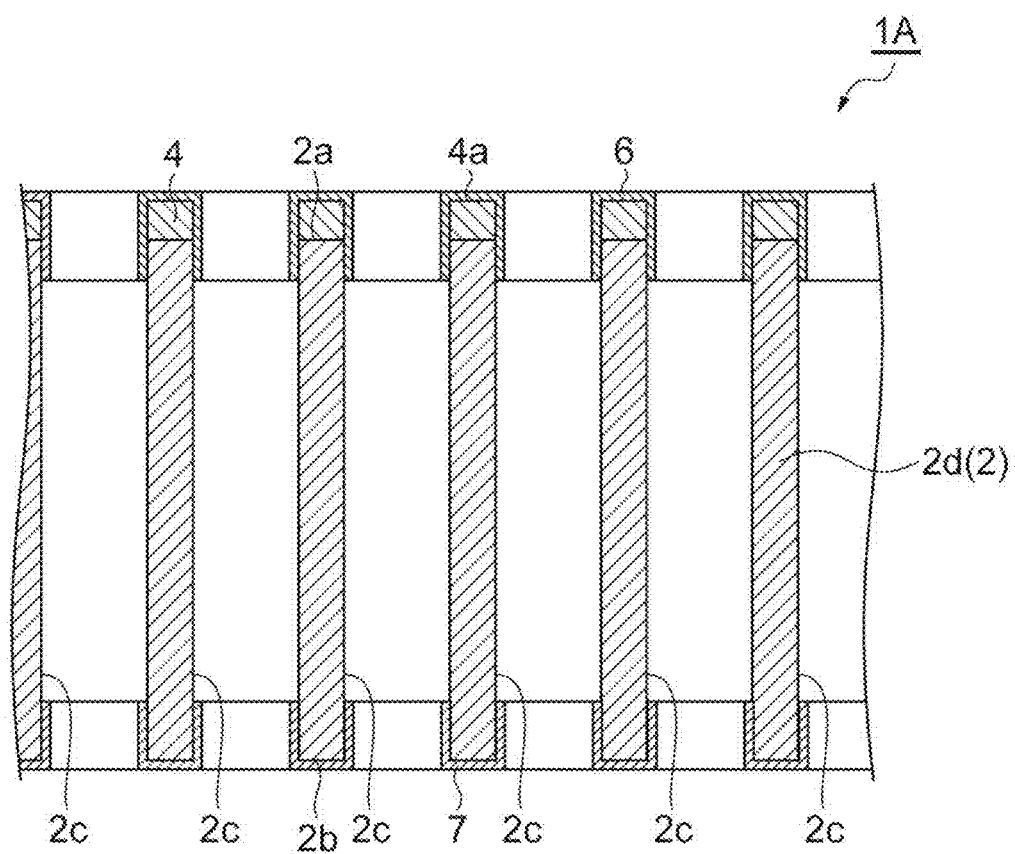
FIG. 9 is an enlarged sectional view of major parts of a sample support body according to a second embodiment.

To be more specific, as illustrated in FIG. 9, the sample support body 1A is different from the sample support body 1 in that, instead of the hydrophobic coating layer 6, the hydrophilic coating layer 7 is provided on the second surface 2b of the substrate 2 and the inner surface of the portion including the edge of each through-hole 2c which is close to the second surface 2b. Further, the sample support body 1A is different from the sample support body 1 in that, instead of the hydrophilic coating layer 7, the hydrophobic coating layer 6 is provided on the third surface 4a of the conductive layer 4 and the inner surface of the portion including the edge of each through-hole 2c which is close to the third surface 4a.

Production Method for Sample Support Body According to the Second Embodiment

A production method for the sample support body 1A is different from the production method for the aforementioned sample support body 1 in that the surface treatment is performed on each of the second surface 2b and the third surface 4a such that the surface close to the second surface 2b has a higher affinity with water than the surface close to the third surface 4a in the second process of the production method for the aforementioned sample support body 1, and is identical to the production method for the aforementioned as to the other aspects. To be specific in the production method for the sample support body 1A, in a second process, the hydrophilic coating layer 7 is provided on the second surface 2b and the inner surface of the portion including the edge of each through-hole 2c which is close to the second surface 2b. Further, the hydrophobic coating layer 6 is provided on the third surface 4a and the inner surface of the portion including the edge of each through-hole 2c which is close to the third surface 4a. From the above, the sample support body 1A illustrated in FIG. 9 is obtained. The hydrophobic coating layer 6 is the same as the coating layer 6 according to the first embodiment, may be provided on at least the third surface 4a, and may not be provided on the inner surface of the portion including the edge of each through-hole 2c which is close to the third surface 4a.

Sample Ionization Method Using Sample Support Body According to the Second Embodiment Next, a sample ionization method (here, a laser desorption/ionization method (a part of a mass spectrometry method using a mass spectrometer 20)) using the sample support body 1A will be described with reference to FIGS. 10 to 12. In FIGS. 10 to 12, the through-holes 2c, the conductive layer 4, the adhesive layer 5, the coating layer 6, and the coating layer 7 are not illustrated in the sample support body 1A. Further, for convenience of illustration, for instance ratios of dimensions are different in the sample support body 1A illustrated in FIG. 9 and the sample support body 1A illustrated in FIGS. 10 to 12.

First, the aforementioned sample support body 1A is prepared (a first process). The sample support body 1A may be prepared by being manufactured by a person who carries out the laser desorption/ionization method and the mass spectrometry method, or be prepared by being obtained from a manufacturer or a seller of the sample support body 1A.

Next, as illustrated in (a) of FIG. 10, the sample S is mounted on a mounting surface 8a of a slide glass 8. Next, as illustrated in (b) of FIG. 10, the sample support body 1A is disposed on the sample S such that the second surface 2b of the substrate 2 faces the sample S (a second process). That is, the sample support body 1A is disposed such that the coating layer 7 is in contact with a surface (an upper surface) of the sample S. In this state, as illustrated in (a) of FIG. 11, the sample support body 1A is fixed to the slide glass 8. In this case, when viewed in the thickness direction of the substrate 2, the sample S is disposed within an effective region R. Further, the sample support body 1A is fixed to the slide glass 8 by a tape 9. Here, the sample S is, for instance, a thin film-like biological sample (hydrous sample) such as a tissue section.

Next, as illustrated in (b) of FIG. 11, in a state in which the sample S is disposed between the slide glass 8 and the sample support body 1A, the components S1 of the sample S move toward the first surface 2a of the substrate 2 (toward the third surface 4a of the conductive layer 4) via the plurality of through-holes 2c (see FIG. 9) due to a capillary phenomenon. The components S1 moving toward the first surface 2a of the substrate 2 stay at the side of the first surface 2a due to surface tension. In a case where the sample S is a dry sample, a solution (e.g., an organic solvent such as acetonitrile, methanol, acetone, etc.) for reducing viscosity of the sample S is added to the sample S. Thus, the components S1 of the sample S can move toward the first surface 2a of the substrate 2 via the plurality of through-holes 2c due to a capillary phenomenon.

Here, in the sample support body 1A, the hydrophilic coating layer 7 (see FIG. 9) is provided on the second surface 2b and the inner surface of the portion including the edge of each through-hole 2c which is close to the second surface 2b, and thus circulation of the components S1 of the sample S from the opening of each through-hole 2c which is close to the second surface 2b into each through-hole 2c is accelerated. That is, the components S1 of the sample S is made to easily enter from the opening of each through-hole 2c which is close to the second surface 2b into each through-hole 2c along the hydrophilic coating layer 7. That is, the hydrophilic coating layer 7 serves to appropriately guide the components S1 of the sample S close to the second surface 2b into each through-hole 2c. Thus, the components S1 of the sample S can be made to appropriately enter into each through-hole 2c.

Further, in the sample support body 1A, the hydrophobic coating layer 6 (see FIG. 9) is provided on the third surface 4a, and thus the components S1 of the sample S moving the inside of the through-holes 2c from the side of the second surface 2b toward the third surface 4a due to a capillary phenomenon can be inhibited from moving up the other through-holes 2c (channels) along the third surface 4a (along the coating layer 6). Thus, original position information of the sample S moving toward the third surface 4a (two-dimensional distribution information of molecules of which the sample S is composed) can be easily maintained, and accuracy (a resolution, an image resolution) of imaging mass spectrometry can be improved.

Next, as illustrated in FIG. 12, in a state in which the sample support body 1A where the components S1 of the sample S stay in each through-hole 2c is fixed to the slide glass 8, the slide glass 8, the sample support body 1A, and the sample S are mounted on a support 21 of the mass spectrometer 20. Next, a voltage is applied to the conductive layer 4 (see FIG. 9) of the sample support body 1A via the mounting surface 8a of the slide glass 8 and the tape 9 by a voltage application part 22 of the mass spectrometer 20. In the present embodiment, the conductive layer 4 and the tape 9 are conducted at a portion at which the coating layer 6 is not provided (a portion of the conductive layer 4 provided on the frame 3). However, the conductive layer 4 and the tape 9 may be brought into contact via the coating layer 6, for instance, in a case where the frame 3 is omitted in the sample support body 1A. The coating layer 6 is not a great obstacle to the conduction between the conductive layer 4 and the tape 9 because it is a very thin film.

Next, a laser beam L is applied to the first surface 2a of the substrate 2 (the third surface 4a of the conductive layer 4) via an opening 3a of the frame 3 by a laser beam application part 23 of the mass spectrometer 20. That is, the laser beam L is applied to a region of the first surface 2a of the substrate 2 (i.e., a region corresponding to the effective region R) which corresponds to the opening 3a of the frame 3. In the present embodiment, the laser beam application part 23 scans the laser beam L onto the region corresponding to the effective region R. At least one of the support 21 and the laser beam application part 23 is operated, and thus the scanning of the laser beam L onto the region corresponding to the effective region R can be performed.

In this way, the laser beam L is applied to the first surface 2a of the substrate 2 while a voltage is applied to the conductive layer 4. Thus, the components S1 of the sample S which stay in the through-holes 2c of the substrate 2 (especially, at the side of the first surface 2a) are ionized, and sample ions S2 (the ionized components S1) are discharged (a third process). To be specific, energy is transmitted from the conductive layer 4 (see FIG. 9) absorbing energy of the laser beam L to the components S1 of the sample S which stay in the through-holes 2c, and the components S1 of the sample S which obtain the energy are evaporated, and obtain electric charges to become the sample ions S2. The above first to fourth processes are equivalent to the ionization method (here, the laser desorption/ionization method) of the sample S using the sample support body 1A. The coating layer 6 is provided on the third surface 4a of the conductive layer 4, but the coating layer 6 is a very thin film as described above, and is not a great obstacle in applying the laser beam L to the conductive layer 4.

The discharged sample ions S2 move while being accelerated toward a ground electrode (not illustrated) provided between the sample support body 1A and an ion detector 24 of the mass spectrometer 20. That is, the sample ions S2 move while being accelerated toward the ground electrode by a potential difference generated between the conductive layer 4 to which a voltage is applied and the ground electrode. The sample ions S2 are detected by the ion detector 24 (a fifth process). In the present embodiment, the mass spectrometer 20 is a scanning mass spectrometer using time-of-flight mass spectrometry (TOF-MS). The above first to fifth processes are equivalent to the mass spectrometry method using the sample support body 1A.

Operation and Effects of the Second Embodiment

As described above, in the sample support body 1A, the surface treatment for improving the affinity with water is performed on the second surface 2b and the inner surface of the portion including the edge of each through-hole 2c which is close to the second surface 2b. In the present embodiment, the hydrophilic coating layer 7 is provided on the second surface 2b and the inner surface of the portion. Due to the coating layer 7, the circulation of the components S1 of the sample S from the openings of the through-holes 2c which are close to the second surface 2b into the through-holes 2c can be accelerated. Thus, in a measuring method (hereinafter referred to as "sucking method") that disposes the sample support body 1A on the sample S such that the second surface 2b of the sample support body 1A faces the sample S, the components S1 of the sample S can be made to appropriately enter into the through-holes 2c, and the signal intensity of the sample ions S2 can be improved.

Further, the hydrophobic coating layer 6 is provided on the third surface 4a. Due to the coating layer 6, the components S1 of the sample S moving the inside of the through-holes 2c from the side of the second surface 2b toward the third surface 4a by a capillary phenomenon can be inhibited from moving up the other through-holes 2c along the third surface 4a in the sucking method. Thus, the original position information of the sample S moving toward the third surface 4a can be easily maintained, and the accuracy of the imaging mass spectrometry can be improved.

Further, according to the production method for the aforementioned sample support body 1A, the sample support body 1A can be appropriately obtained. To be specific, the second process in the production method for the sample support body 1A includes a process of performing the surface treatment for improving the affinity with water on the second surface 2b and the inner surface of the portion including the edge of each through-hole 2c which is close to the second surface 2b. In the present embodiment, the second process includes a process of providing the hydrophilic coating layer 7 on the second surface 2b and the inner surface of the portion. Thus, the sample support body 1A capable of accelerating the circulation of the components S1 of the sample S from the openings of the through-holes 2c which are close to the second surface 2b into the through-holes 2c, or the sample support body 1A capable of improving the signal intensity of the sample ions S2 in the sucking method, can be appropriately obtained. Further, the second process includes a process of providing the hydrophobic coating layer 6 on the third surface 4a. Thus, the sample support body 1A in which the components S1 of the sample S moving the inside of the through-holes 2c from the side of the second surface 2b toward the third surface 4a by a capillary phenomenon can be inhibited from moving up the other through-holes 2c along the third surface 4a can be obtained. Further, in the second process, the hydrophilic coating layer 7 is formed by forming a film of titanium oxide or zinc oxide. Thus, the hydrophilic coating layer 7 can be easily and appropriately formed. Further, in the second process, the hydrophobic coating layer 6 is formed by vapor deposition of a metal or of a self-assembled monolayer. Thus, the hydrophobic coating layer 6 can be easily and appropriately formed.

Further, according to the sample ionization method using the aforementioned sample support body 1A, ionization is performed by the sucking method using the sample support body 1A capable of accelerating the circulation of the components S1 of the sample S from the openings of the through-holes 2c which are close to the second surface 2b into the through-holes 2c, and thus the sample ions S2 can be appropriately detected. Furthermore, the hydrophobic coating layer 6 is provided on the third surface 4a, and thus because the components S1 of the sample S moving toward the third surface 4a can be inhibited from moving up the other through-holes 2c along the third surface 4a, the accuracy of the imaging mass spectrometry can be improved.

Further, in the case where the sample S is a dry sample, the solution (e.g., an organic solvent such as acetonitrile, methanol, acetone, etc.) for reducing the viscosity of the sample S is added to the sample S mounted on the mounting surface 8a, before the third process. Thus, in the case where the sample S to be measured is a dry sample, the movement of the components S1 of the sample S into the through-holes 2c due to a capillary phenomenon can be accelerated. As a result, in a case where the dry sample is ionized by a sucking method, the signal intensity of the sample ions S2 can be appropriately improved.

Modification of the Second Embodiment

In the second embodiment, the surface treatment is performed on both the second surface 2b and the third surface 4a (here, the formation of the coating layers 6 and 7), but the surface treatment may be performed on only either the second surface 2b or the third surface 4a. For example, in a case where the imaging mass spectrometry is not performed (in a case where there is no need to prevent to the movement of the components S1 of the sample S on the third surface 4a), the aforementioned coating layer 6 may be omitted. Further, for example, in a case where there is no need to further accelerate inflow of the components S1 of the sample S from the openings of the through-holes 2c which are close to the second surface 2b, the aforementioned coating layer 7 may be omitted.

Further, the substrate 2 may have conductivity, and a voltage may be applied to the substrate 2 in a mass spectrometry method. In the case where the substrate 2 has conductivity, the conductive layer 4 can be omitted in the sample support body 1A, and the same effects as in the case where the sample support body 1A including the aforementioned conductive layer 4 is used can be obtained. In this case, "the third surface 4a of the conductive layer 4" in the second embodiment is read as "the first surface 2a." That is, the coating layer 6 that is provided on the third surface 4a and the inner surface of the portion including the edge of each through-hole 2c which is close to the third surface 4a is provided on the first surface 2a and the inner surface of the portion including the edge of each through-hole 2c which is close to the first surface 2a.

While the embodiments of the present disclosure have been described, the present disclosure is not limited to the above embodiments, and can be variously modified without departing from the spirit and scope of the present disclosure.

For example, in the above embodiments, as the surface treatment for improving the affinity with water, treatment for providing the hydrophilic coating layer 7 is given by way of example. However, the surface treatment for improving the affinity with water is not limited to the treatment. For example, as the surface treatment for improving the affinity with water, treatment for performing excimer application or plasma application instead of providing the hydrophilic coating layer (or in combination with the treatment for providing the hydrophilic coating layer) may be performed. Likewise, in the above embodiments, as the surface treatment for reducing the affinity with water, treatment for providing the hydrophobic coating layer 6 is given by way of example. However, the surface treatment for reducing the affinity with water is not limited to the treatment. For example, as the surface treatment for reducing the affinity with water, treatment for changing surface roughness by means of dry etching such as ion milling (roughening treatment, or the like) may be performed instead of providing the hydrophobic coating layer (or in combination with the treatment for providing the hydrophobic coating layer).

Further, if the conductive layer 4 is provided on at least the first surface 2a of the substrate 2, the conductive layer 4 may not be provided on the second surface 2b of the substrate 2 and the inner surfaces of the through-holes 2c, or may be provided on the second surface 2b of the substrate 2 and the inner surfaces of the through-holes 2c. Further, in the sample ionization method using the aforementioned sample support body 1 or 1A, the sample support body 1 or 1A may be fixed to the slide glass 8 by a means other than the tape 9 (e.g., a means using an adhesive, a fixture, or the like).

Further, in the mass spectrometer 20, the laser beam application part 23 applies the laser beam L to the region corresponding to the effective region R in block, and the ion detector 24 may detect the sample ions S2 while maintaining the two-dimensional information of the region. That is, the mass spectrometer 20 may be a projection type mass spectrometer. Further, the aforementioned sample ionization method can be used in the mass spectrometry (including the imaging mass spectrometry) of the molecules of which the sample S is composed as well as other measurement such as ion mobility measurement and other experiments.

Further, use of the sample support body 1 is not limited to the ionization of the sample S caused by the application of the laser beam L. The sample support body 1 may be used for the ionization of the sample S caused by the application of an energy beam (e.g., an ion beam, an electron beam, or the like) other than the laser beam L.

Further, in the aforementioned embodiments, one effective region R is provided on the substrate 2, but a plurality of effective regions R may be provided on the substrate 2. Further, the plurality of through-holes 2c need not be formed in the effective region R only and, as in the aforementioned embodiments, the plurality of through-holes 2c may be formed, for instance, in the entire substrate 2. That is, the plurality of through-holes 2c may be formed at least in the effective region R. Further, in the aforementioned embodiments, the sample S is disposed such that one sample S corresponds to one effective region R, but a plurality of samples S may be disposed such that the plurality of samples S correspond to one effective region R.

REFERENCE SIGNS LIST 1, 1A Sample support body
2 Substrate
2a First surface
2b Second surface
2c Through-hole
4 Conductive layer
4a Third surface
6 Coating layer (hydrophilic coating layer)
7 Coating layer (hydrophobic coating layer)
8 Slide glass (mount)
8a Mounting surface
L Laser beam (energy beam)
S Sample
S1 Component
S2 Sample ion

The invention claimed is:
1. A sample support body for ionization of a sample comprising:
   a substrate having a first surface and a second surface opposite to each other; and
   a conductive layer provided on at least the first surface,
   wherein a plurality of through-holes, which open to the second surface and a third surface of the conductive layer which is located on a side opposite to the substrate, are formed in the substrate and the conductive layer, and
   at least one of the second surface and the third surface is subjected to surface treatment for providing a differ- ence in an affinity with water between a surface close to the second surface and a surface close to the third surface.

2. The sample support body according to claim 1, wherein a hydrophobic coating layer is provided on the second surface such that the surface close to the third surface has a higher affinity with water than the surface close to the second surface.

3. The sample support body according to claim 1, wherein:
surface treatment for improving the affinity with water is performed on the third surface and an inner surface of a portion including an edge of each through-hole which is close to the third surface such that the surface close to the third surface has a higher affinity with water than the surface close to the second surface; and
the surface treatment for improving the affinity with water includes at least one of, providing a hydrophilic coating layer on the third surface and the inner surface of the portion, and performing excimer application or plasma application on the third surface and the inner surface of the portion.

4. The sample support body according to claim 1, wherein:
surface treatment for improving the affinity with water is performed on the second surface and an inner surface of a portion including an edge of each through-hole which is close to the second surface such that the surface close to the second surface has a higher affinity with water than the surface close to the third surface; and
the surface treatment for improving the affinity with water includes at least one of, providing a hydrophilic coating layer on the second surface and the inner surface of the portion, and performing excimer application or plasma application on the second surface and the inner surface of the portion.

5. The sample support body according to claim 1, wherein a hydrophobic coating layer is provided on the third surface such that the surface close to the second surface has a higher affinity with water than the surface close to the third surface.

6. The sample support body according to claim 1, wherein the substrate is formed by anodizing a valve metal or silicon.

7. The sample support body according to claim 1, wherein widths of the through-holes are 1 nm to 700 nm.

8. The sample support body according to claim 1, wherein a material of the conductive layer is platinum or gold.

9. A sample support body for ionization of a sample comprising
a substrate which has conductivity and is formed with a plurality of through-holes which open to a first surface and a second surface opposite to each other,
wherein at least one of the first surface and the second surface is subjected to surface treatment for providing a difference in an affinity with water between a surface close to the first surface and a surface close to the second surface,
the surface treatment is
treatment that includes at least one of, providing a hydrophilic coating layer on the first surface and an inner surface of a portion including an edge of each through-hole which is close to the first surface such that a surface close to the first surface has a higher affinity with water than a surface close to the second surface, and performing excimer application or plasma application on the first surface and the inner surface of the portion including the edge of each through-hole which is close to the first surface, or
treatment that includes at least one of, providing a hydrophilic coating layer on the second surface and an inner surface of a portion including an edge of each through-hole which is close to the second surface such that the surface close to the second surface has a higher affinity with water than the surface close to the first surface, and performing excimer application or plasma application on the second surface and the inner surface of the portion including the edge of each through-hole which is close to the second surface.

10. The sample support body according to claim 3, wherein the hydrophilic coating layer is a layer formed by forming a film of titanium oxide or zinc oxide.

11. The sample support body according to claim 2, wherein the hydrophobic coating layer is a layer formed by vapor deposition of a metal, or a layer formed of a self-assembled monolayer.

12. A production method for a sample support body for ionization of a sample comprising:
a first process of preparing a substrate having a first surface and a second surface opposite to each other and a conductive layer provided on at least the first surface, wherein a plurality of through-holes, which open to the second surface and a third surface of the conductive layer which is located on a side opposite to the substrate, are formed in the substrate and the conductive layer; and
a second process of performing surface treatment, for providing a difference in an affinity with water between a surface close to the second surface and a surface close to the third surface, on at least one of the second surface and the third surface.

13. The production method according to claim 12, wherein the second process includes a process of providing a hydrophobic coating layer on the second surface such that the surface close to the third surface has a higher affinity with water than the surface close to the second surface.

14. The production method according to claim 12, wherein:
the second process includes a process of performing surface treatment for improving the affinity with water on the third surface and an inner surface of a portion including an edge of each through-hole which is close to the third surface such that the surface close to the third surface has a higher affinity with water than the surface close to the second surface; and
the surface treatment for improving the affinity with water includes at least one of, providing a hydrophilic coating layer on the third surface and the inner surface of the portion, and performing excimer application or plasma application on the third surface and the inner surface of the portion.

15. The production method according to claim 12, wherein:
the second process includes a process of performing surface treatment for improving the affinity with water on the second surface and an inner surface of a portion including an edge of each through-hole which is close to the second surface such that the surface close to the second surface has a higher affinity with water than the surface close to the third surface; and
the surface treatment for improving the affinity with water includes at least one of, providing a hydrophilic coating layer on the second surface and the inner surface of the portion, and performing excimer application or plasma application on the second surface and the inner surface of the portion.

16. The production method according to claim 12, wherein the second process includes a process of providing a hydrophobic coating layer on the third surface such that the surface close to the second surface has a higher affinity with water than the surface close to the third surface.

17. A production method for a sample support body for ionization of a sample comprising:
a first process of preparing a substrate which has conductivity and is formed with a plurality of through-holes which open to a first surface and a second surface opposite to each other; and
a second process of performing surface treatment, for providing a difference in an affinity with water between a surface close to the first surface and a surface close to the second surface, on at least one of the first surface of the substrate and the second surface of the substrate,
wherein the surface treatment is
treatment that includes at least one of, providing a hydrophilic coating layer on the first surface and an inner surface of a portion including an edge of each through-hole which is close to the first surface such that a surface close to the first surface has a higher affinity with water than a surface close to the second surface, and performing excimer application or plasma application on the first surface and the inner surface of the portion including the edge of each through-hole which is close to the first surface, or
treatment that includes at least one of, providing a hydrophilic coating layer on the second surface and an inner surface of a portion including an edge of each through-hole which is close to the second surface such that the surface close to the second surface has a higher affinity with water than the surface close to the first surface, and performing excimer application or plasma application on the second surface and the inner surface of the portion including the edge of each through-hole which is close to the second surface.

18. The production method according to claim 14, wherein, in the second process, the hydrophilic coating layer is formed by forming a film of titanium oxide or zinc oxide.

19. The production method according to claim 13, wherein, in the second process, the hydrophobic coating layer is formed by vapor deposition of a metal, or is formed of a self-assembled monolayer.

20. A sample ionization method comprising:
a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer;
a second process of mounting the sample support body on a mounting surface of a mount such that the second surface faces the mounting surface;
a third process of dropping a solution including a sample onto the plurality of through-holes from a side of the third surface; and
a fourth process of applying an energy beam to the third surface while applying a voltage to the conductive layer and thus ionizing components of the sample,
wherein a hydrophobic coating layer is provided on the second surface of the substrate such that a surface close to the third surface has a higher affinity with water than a surface close to the second surface.

21. The sample ionization method according to claim 20, wherein surface treatment for improving the affinity with water is performed on the third surface and an inner surface of a portion including an edge of each through-hole which is close to the third surface.

22. A sample ionization method comprising:
a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer;
a second process of mounting the sample support body on a mounting surface of a mount such that the second surface faces the mounting surface;
a third process of dropping a solution including a sample onto the plurality of through-holes from a side of the third surface; and
a fourth process of applying an energy beam to the third surface while applying a voltage to the conductive layer and thus ionizing components of the sample,
wherein surface treatment for improving an affinity with water is performed on the third surface and an inner surface of a portion including an edge of each through-hole which is close to the third surface such that a surface close to the third surface has a higher affinity with water than a surface close to the second surface.

23. A sample ionization method comprising:
a first process of preparing a sample support body that includes a substrate which has conductivity and is formed with a plurality of through-holes that open to a first surface and a second surface opposite to each other;
a second process of mounting the sample support body on a mounting surface of a mount such that the second surface faces the mounting surface;
a third process of dropping a solution including a sample onto the plurality of through-holes from a side of the first surface; and
a fourth process of applying an energy beam to the first surface while applying a voltage to the substrate and thus ionizing components of the sample,
wherein a hydrophobic coating layer is provided on the second surface such that a surface close to the first surface has a higher affinity with water than a surface close to the second surface.

24. A sample ionization method comprising:
a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer;
a second process of disposing the sample support body on a sample such that the second surface faces the sample mounted on a mounting surface of a mount; and
a third process of applying an energy beam to the third surface while applying a voltage to the conductive layer in a state in which components of the sample move toward the third surface via the plurality of through-holes due to a capillary phenomenon, and thus ionizing the components of the sample, wherein surface treatment for improving an affinity with water is performed on the second surface and an inner surface of a portion including an edge of each through-hole which is close to the second surface such that a surface close to the second surface has a higher affinity with water than a surface close to the third surface.

25. The sample ionization method according to claim 24, wherein a hydrophobic coating layer is provided on the third surface such that the surface close to the second surface has a higher affinity with water than the surface close to the third surface.

26. A sample ionization method comprising:
a first process of preparing a sample support body that includes a substrate which has a first surface and a second surface opposite to each other, and a conductive layer provided on at least the first surface, wherein a plurality of through-holes, which open to the second surface and a third surface of the conductive layer which is located on a side opposite to the substrate, are formed in the substrate and the conductive layer;
a second process of disposing the sample support body on a sample such that the second surface comes into contact with the sample mounted on a mounting surface of a mount; and
a third process of applying an energy beam to the third surface while applying a voltage to the conductive layer in a state in which components of the sample move toward the third surface via the plurality of through-holes due to a capillary phenomenon, and thus ionizing the components of the sample, wherein a hydrophobic coating layer is provided on the third surface such that a surface close to the second surface has a higher affinity with water than a surface close to the third surface.

27. A sample ionization method comprising:
a first process of preparing a sample support body that includes a substrate which has conductivity and is formed with a plurality of through-holes that open to a first surface and a second surface opposite to each other;
a second process of disposing the sample support body on a sample such that the second surface faces the sample mounted on a mounting surface of a mount; and
a third process of applying an energy beam to the first surface while applying a voltage to the substrate in a state in which components of the sample move toward the first surface via the plurality of through-holes due to a capillary phenomenon, and thus ionizing the components of the sample, wherein surface treatment for improving an affinity with water is performed on the second surface and an inner surface of a portion including an edge of each through-hole which is close to the second surface such that a surface close to the second surface has a higher affinity with water than a surface close to the first surface.

28. The sample ionization method according to claim 24, wherein:
the sample is a dry sample; and
the sample ionization method further comprises a process of adding a solution for reducing a viscosity of the sample to the sample mounted on the mounting surface before the third process.

* * * * *